(12) United States Patent
Silverstein et al.

(10) Patent No.: US 6,805,445 B2
(45) Date of Patent: Oct. 19, 2004

(54) PROJECTION DISPLAY USING A WIRE GRID POLARIZATION BEAMSPLITTER WITH COMPENSATOR

(75) Inventors: Barry D. Silverstein, Rochester, NY (US); Gary E. Nothhard, Rochester, NY (US); Andrew F. Kurtz, Rochester, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 10 days.

(21) Appl. No.: 10/163,228

(22) Filed: Jun. 5, 2002

(65) Prior Publication Data

US 2003/0227597 A1 Dec. 11, 2003

(51) Int. Cl.[7] .................. G03B 21/14; G03B 21/28; G02B 27/28; G02B 5/30; G02F 1/1335
(52) U.S. Cl. .................. 353/20; 353/38; 353/81; 359/486; 359/495; 349/9; 349/117
(58) Field of Search .................. 353/20, 31, 34, 353/37, 38, 48, 84, 33, 81; 359/486, 489, 668, 670, 72, 246, 247, 263, 267, 292, 487, 49, 41, 48, 493, 495, 483, 485, 494, 237, 900, 259, 248, 497; 349/9, 65, 48, 8, 5, 117, 96, 113; 362/19, 263, 293, 26, 311; 356/369, 364, 450

(56) References Cited

U.S. PATENT DOCUMENTS

| | | | |
|---|---|---|---|
| 2,237,567 A | 4/1941 | Land | 359/491 |
| 2,403,731 A | 7/1946 | MacNeille | 359/488 |
| 2,815,452 A | * 12/1957 | Mertz | 250/338.1 |
| 4,441,791 A | 4/1984 | Hornbeck | 359/295 |
| 4,701,028 A | 10/1987 | Clerc et al. | 349/98 |
| 5,039,185 A | 8/1991 | Uchida et al. | 349/119 |
| 5,298,199 A | 3/1994 | Hirose et al. | 264/2.6 |
| 5,383,053 A | 1/1995 | Hegg et al. | 359/486 |

(List continued on next page.)

OTHER PUBLICATIONS

J. Chen, K.–H. Kim, J.–J Jyu, and J. H. Souk; Optimum film Compensation Modes for TN and VA LCDs; SID 98 Digest, pp. 315–318.

(List continued on next page.)

Primary Examiner—Alan A. Mathews
Assistant Examiner—Rochelle Blackman
(74) Attorney, Agent, or Firm—Nelson Adrian Blish

(57) ABSTRACT

A display apparatus (10) including a light source (15) for forming a beam of light (130). A pre-polarizer (45) polarizes the beam of light (130) to provide a polarized beam of light. A wire grid polarization beamsplitter (50) receives the polarized beam of light and transmits the polarized beam of light which has a first polarization, and reflects the polarized beam of light which has a second polarization. A reflective spatial light modulator (55) selectively modulates the polarized beam of light that has a first polarization to encode image data thereon in order to form a modulated beam (360) and reflects the modulated beam back to the wire grid polarization beamsplitter (50). A compensator (260) is located between the wire grid polarization beamsplitter (50) and the reflective spatial light modulator (55) for conditioning oblique and skew rays of the modulated beam (360). The wire grid polarization beamsplitter (50) reflects the compensated modulated beam (360) and the wire gird polarization beamsplitter (50) is rotated in plane to optimize the contrast. A polarization analyzer (60) removes residual light of the opposite polarization state from the compensated modulated beam (360). Image-forming optics (20) form an image from the compensated modulated beam (360).

81 Claims, 9 Drawing Sheets

U.S. PATENT DOCUMENTS

| | | | |
|---|---|---|---|
| 5,430,573 A | 7/1995 | Araujo et al. | 359/361 |
| 5,576,854 A | 11/1996 | Schmidt et al. | 349/5 |
| 5,600,383 A | 2/1997 | Hornbeck | 348/771 |
| 5,619,352 A | 4/1997 | Koch et al. | 349/89 |
| 5,652,667 A | 7/1997 | Kuragane | 349/42 |
| 5,748,368 A | 5/1998 | Tamada et al. | 359/486 |
| 5,808,795 A | 9/1998 | Shimomura et al. | 359/488 |
| 5,844,722 A | 12/1998 | Stephens et al. | 359/637 |
| 5,912,762 A | 6/1999 | Li et al. | 359/352 |
| 5,914,818 A | 6/1999 | Tejada et al. | 359/663 |
| 5,918,961 A | 7/1999 | Ueda | 353/20 |
| 5,969,861 A | 10/1999 | Ueda et al. | 359/488 |
| 5,978,056 A | 11/1999 | Shintani et al. | 349/137 |
| 6,049,428 A | 4/2000 | Khan et al. | 359/491 |
| 6,089,717 A | 7/2000 | Iwai | 353/31 |
| 6,122,103 A | 9/2000 | Perkins et al. | 359/486 |
| 6,215,547 B1 * | 4/2001 | Ramanujan et al. | 355/67 |
| 6,234,634 B1 | 5/2001 | Hansen et al. | 353/20 |
| 6,243,199 B1 | 6/2001 | Hansen et al. | 359/486 |
| 6,243,634 B1 | 6/2001 | Oestreicher et al. | 701/45 |
| 6,288,840 B1 | 9/2001 | Perkins et al. | 359/486 |
| 6,447,120 B1 | 9/2002 | Hansen et al. | 353/20 |
| 6,486,997 B1 * | 11/2002 | Bruzzone et al. | 359/247 |
| 6,511,183 B2 | 1/2003 | Shimizu et al. | 353/20 |
| 6,585,378 B2 | 7/2003 | Kurtz et al. | 353/31 |
| 6,661,475 B1 | 12/2003 | Stahl et al. | 349/9 |
| 6,669,343 B2 | 12/2003 | Shahzad et al. | 353/20 |
| 2003/0081179 A1 * | 5/2003 | Pentico et al. | 353/20 |
| 2003/0128320 A1 * | 7/2003 | Mi et al. | 349/117 |

OTHER PUBLICATIONS

I. Richter, P.–C. Sun, F. Xu, and Y. Fainman; Design Considerations of Form Birefringent Microstructures; Applied Optics, May 1995, vol. 34, No. 14, pp. 2421–2429.

R.–C. Tyan et al.; Design, Fabricatio, and Characterization of Form–Birefringent Multilayer Polarizing Beam Splitter; Optical Society of America, Jul. 1997, vol. 14, No. 7, pp. 1627–1636.

* cited by examiner

PROJECTION DISPLAY USING A WIRE GRID POLARIZATION BEAMSPLITTER WITH COMPENSATOR

CROSS REFERENCE TO RELATED APPLICATIONS

Reference is made to commonly-assigned copending U.S. patent application Ser. No. 10/040,663, filed Jan. 7, 2002, entitled DISPLAY APPARATUS USING A WIRE GRID POLARIZING BEAMSPLITTER WITH COMPENSATOR, by Mi et al.; U.S. patent application Ser. No. 09/813,207, filed Mar. 20, 2001, entitled DIGITAL CINEMA PROJECTOR, by Kurtz et al.; and U.S. patent application Ser. No. 10/050,309, filed Jan. 16, 2002, entitled PROJECTION APPARATUS USING SPATIAL LIGHT MODULATORS, by Joshua M. Cobb, the disclosures of which are incorporated herein.

FIELD OF THE INVENTION

This invention generally relates to digital projection apparatus employing liquid crystal devices for image forming and more particularly to an apparatus and method for achieving high levels of contrast by using a slightly rotated wire grid polarization beamsplitter in combination with a liquid crystal display (LCD) and a polarization compensator for minimizing leakage light in the pixel black (OFF) state.

BACKGROUND OF THE INVENTION

In order to be considered as suitable replacements for conventional film projectors, digital projection systems must meet demanding requirements for image quality. In particular, to provide a competitive alternative to conventional cinematic-quality projectors, digital projection systems need to provide high resolution, wide color gamut, high brightness (>10,000 screen lumens), and frame-sequential system contrast ratios exceeding 1,000:1. In addition, the digital systems must also provide constancy of image quality, image data security, low equipment purchase and maintenance costs, and low data distribution costs, to make a switchover from conventional film based systems compelling.

The most promising solutions for digital cinema projection employ one of two types of spatial light modulators as image forming devices. The first type of spatial light modulator is the digital micromirror device (DMD), developed by Texas Instruments, Inc., Dallas, Tex. DMD devices are described in a number of patents, including for example U.S. Pat. Nos. 4,441,791 and 5,600,383 (both to Hornbeck). Optical designs for projection apparatus employing DMDs are disclosed in numerous patents, including U.S. Pat. Nos. 5,914,818 (Tejada et al.) and 6,089,717 (Iwai). Although DMD-based projectors demonstrate some capability to provide the necessary light throughput, contrast ratio, and color gamut, the current resolution limitations (1024×768 pixels), as well as high component and system costs, have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. At high resolution, large area LCDs can be fabricated more readily than DMDs. LCDs are a viable alternative modulator technology to be used in digital cinema projection systems. Among examples of electronic projection apparatus that utilize LCD spatial light modulators are those disclosed in U.S. Pat. Nos. 5,808,795 (Shimomura et al.) and 5,918,961 (Ueda). A few years ago, JVC demonstrated an LCD-based projector capable of high-resolution (providing 2,000×1280 pixels), high frame sequential contrast (in excess of 1000:1), and high light throughput (nominally, up to 12,000 lumens). This system utilized three vertically aligned (VA) (also referred as homeotropic) LCDs (one per color) driven or addressed by cathode ray tubes (CRTs). While this system demonstrated the potential for an LCD based digital cinema projector, system complexity and overall reliability remain concerns. In addition, that particular prototype system had a high unit cost that made it unacceptable for broad commercialization in a digital cinema projection market.

JVC has also developed a new family of vertically aligned LCDs, which are directly addressed via a silicon backplane (LCOS), rather than indirectly by a CRT. While these new devices are promising, they have not yet been demonstrated to fully meet the expectations for digital cinema presentation. The JVC LCD devices are described, in part, in U.S. Pat. Nos. 5,652,667 (Kuragane) and 5,978,056 (Shintani et al.) In contrast to most twisted nematic or cholesteric LCDs, vertically aligned LCDs promise to provide much higher modulation contrast ratios (in excess of 2,000:1). It is instructive to note that, in order to obtain on screen frame sequential contrast of 1,000:1 or better, the entire system must produce >1000:1 contrast, and both the LCDs and any necessary polarization optics must each separately provide ~2,000:1 contrast. Notably, while polarization compensated vertically aligned LCDs can provide contrast >20,000:1 when modulating collimated laser beams, these same modulators may exhibit contrasts of 500:1 or less when modulating the same collimated laser beams without the appropriate polarization compensation. Modulation contrast is also dependent on the spectral bandwidth and angular width (F#) of the incident light, with contrast generally dropping as the bandwidth is increased or the F# is decreased. Modulation contrast within LCDs can also be reduced by residual depolarization or mis-orienting polarization effects, such as thermally induced stress birefringence. Such effects can be observed in the far field of the device, where the ideally observed "iron cross" polarization contrast pattern takes on a degenerate pattern.

As is obvious to those skilled in the digital projection art, the optical performance provided by a LCD based electronic projection system is, in large part, defined by the characteristics of the LCDs themselves and by the polarization optics that support LCD projection. The performance of polarization separation optics, such as polarization beamsplitters, pre-polarizers, and polarizer/analyzer components is of particular importance for obtaining high contrast ratios. The precise manner in which these polarization optical components are combined within a modulation optical system of a projection display can also have significant impact on the final resultant contrast.

The most common conventional polarization beamsplitter solution, which is used in many projection systems, is the traditional MacNeille prism, disclosed in U.S. Pat. No. 2,403,731. This device has been shown to provide a good extinction ratio (on the order of 300:1). However, this standard prism operates well only with incident light over a limited range of angles (a few degrees). Because the MacNeille prism design provides good extinction ratio for one polarization state only, a design using this device must effectively discard half of the incoming light when this light is from an unpolarized white light source, such as from a xenon or metal halide arc lamp.

Conventional glass polarization beamsplitter design, based on the MacNeille design, has other limitations beyond the limited angular response, including fabrication or thermally induced stress birefringence. These effects, which can degrade the polarization contrast performance, may be acceptable for mid range electronic projection applications, but are not tolerable for cinema projection applications. The thermal stress problem has been improved upon, with the use of a more suitable low photo-elasticity optical glass, disclosed in U.S. Pat. No. 5,969,861 (Ueda et al.), which was specially designed for use in polarization components. Unfortunately, high fabrication costs and uncertain availability limit the utility of this solution. As a result of these problems, the conventional MacNeille based glass beamsplitter design, which works for low to mid-range electronic projection systems, operating at 500–5,000 lumens with approximately 800:1 contrast, falls short for digital cinema projection.

Other polarization beamsplitter technologies have been proposed to meet the needs of a LCD based digital cinema projection system. For example, the beamsplitter disclosed in U.S. Pat. No. 5,912,762 (Li et al.) has theoretical transmitted and reflected extinction ratios in excess of 2,000:1. This prism offers the potential of using both polarizations with a six LCD system, thereby enhancing system light efficiency. However, size constraints and extremely tight coating tolerances present significant obstacles to commercialization of a projection apparatus using this beamsplitter design.

Alternately, liquid-filled beamsplitters (see U.S. Pat. No. 5,844,722 (Stephens), for example) have been shown to provide high extinction ratios needed for high-contrast applications and have some advantages under high-intensity light conditions. However, these devices have several operational problems including temperature sensitivity, are costly to manufacture, and must be fabricated without dust or contained bubbles. Leakage risk presents another potential disadvantage for these devices.

Wire grid polarizers have been in existence for many years, and were primarily used in radio-frequency and far infrared optical applications. Use of wire grid polarizers with visible spectrum light has been limited, largely due to constraints of device performance or manufacture. For example, U.S. Pat. No. 5,383,053 (Hegg et al.) discloses use of a wire grid beamsplitter in a virtual image display apparatus, which has high light efficiency but very low contrast (6.3:1). A second wire grid polarizer for the visible spectrum is disclosed in U.S. Pat. No. 5,748,368 (Tamada). While the device discussed by Tamada provides polarization separation, the contrast ratio is inadequate for cinematic projection and the design is inherently limited to rather narrow wavelength bands.

Recently, as is disclosed in U.S. Pat. Nos. 6,122,103 (Perkins et al.); 6,243,199 (Hansen et al.); and 6,288,840 (Perkins et al.), high quality wire grid polarizers and beamsplitters have been developed for broadband use in the visible spectrum. These new devices are commercially available from Moxtek Inc. of Orem, Utah. While existing wire grid polarizers, including the devices described in U.S. Pat. Nos. 6,122,103 and 6,243,199 may not exhibit all of the necessary performance characteristics needed for obtaining the high contrast required for digital cinema projection, these devices do have a number of advantages. When compared against standard polarizers, wire grid polarization devices exhibit relatively high extinction ratios and high efficiency. Additionally, the contrast performance of these wire grid devices also has broader angular acceptance (NA or numerical aperture) and more robust thermal performance with less opportunity for thermally induced stress birefringence than standard polarization devices. Furthermore, the wire grid polarizers are robust relative to harsh environmental conditions, such as light intensity, temperature, and vibration. While generally these commercially available wire grid devices perform well across the visible spectrum, an innate blue fall off in the polarization response can mean that the blue channel may require additional contrast enhancement to match the red and green for demanding applications.

Wire grid polarization beamsplitter (PBS) devices have been employed within some digital projection apparatus. For example, U.S. Pat. No. 6,243,199 (Hansen et al.) discloses use of a broadband wire grid polarization beamsplitter for projection display applications. U.S. Pat. No. 6,234,634 (also to Hansen et al.) discloses a wire grid polarization beamsplitter that functions as both polarizer and analyzer in a digital image projection system. U.S. Pat. No. 6,234,634 states that very low effective F#'s can be achieved using wire grid PBS, although with some loss of contrast. Notably, U.S. Pat. No. 6,234,634 does not discuss how the angular response of the wire grid polarizers can be enhanced, nor how polarization compensation may be used in combination with wire grid devices and LCDs, to reduce light leakage and boost contrast, particularly for fast optical systems operating at low F#'s.

Of particular interest and relevance for the apparatus and methods of the present invention, it must be emphasized that individually neither the wire grid polarizer, nor the wire grid polarization beamsplitter, provide the target polarization extinction ratio performance (nominally >2,000:1) needed to achieve the desired projection system frame sequential contrast of 1,000:1 or better, particularly at small F#'s (<F/3.5). Rather, both of these components provide less than ~1,200:1 contrast under the best conditions. Significantly, performance falls off further in the blue spectrum. Therefore, to achieve the desired 2,000:1 contrast target for the optical portion of the system (excluding the LCDs), it is necessary to utilize a variety of polarization devices, including possibly wire grid polarization devices, in combination within a modulation optical system of the projection display. However, the issues of designing an optimized configuration of polarization optics, including wire grid polarizers and polarization compensators, in combination with LCDs, color optics, and projection lens, have not been completely addressed either for electronic projection in general, or for digital cinema projection in particular. Moreover, the prior art does not describe how to design a modulation optical system for a projection display using both LCDs and wire grid devices, which further has polarization compensators to boost contrast.

There are numerous examples of polarization compensators developed to enhance the polarization performance of LCDs generally, and vertically aligned LCDs particularly. In an optimized system, the compensators are simultaneously designed to enhance the performance of the LCDs and the polarization optics in combination. These compensators typically provide angularly varying birefringence, structured in a spatially variant fashion, to affect polarization states in portions (within certain spatial and angular areas) of the transiting light beam, without affecting the polarization states in other portions of the light beam. As a first example, U.S. Pat. No. 4,701,028 (Clerc et al.) discloses birefringence compensation designed for a vertically aligned LCD with restricted thickness. As another example, U.S. Pat. No. 5,039,185 (Uchida et al.) discloses a vertically aligned LCD with compensator comprising at least two uniaxial or two biaxial retarders provided between a sheet polarizer/analyzer pair. Additionally, U.S. Pat. No. 5,298,199 (Hirose et al.) discloses the use of a biaxial film compensator correcting for optical birefringence errors in the LCD, used in a package with crossed sheet polarizers, where the LCD dark state has a non-zero voltage (a bias voltage).

Compensators can be complex structures, comprising one or more layers of films, optical adhesives, and other materials. For example, U.S. Pat. No. 5,619,352 (Koch et al.) discloses compensation devices, usable with twisted nematic LCDs, where the compensators have a multi-layer construction, using combinations of A-plates, C-plates, and O-plates, as needed.

Polarization compensators can also be designed which correct for both the vertically aligned LCD and the polarization optics in combination. Most of these prior art compensator patents discussed previously, assume the LCDs are used in combination with sheet polarizers, and correct only for the LCD polarization errors. However, polarization compensators have also been explicitly developed to correct for non-uniform polarization effects from the conventional Polaroid type dye sheet polarizer. The dye sheet polarizer, developed by E. H. Land in 1929 functions by dichroism, or the polarization selective anistropic absorption of light. Compensators for dye sheet polarizers are described in Chen et al. (J. Chen, K.-H. Kim, J.-J. Kyu, J. H. Souk, J. R. Kelly, P. J. Bos, "Optimum Film Compensation Modes for TN and VA LCDs", SID 98 Digest, pgs. 315–318.), and use a combination A-plate and C-plate construction. Similarly, U.S. Pat. No. 5,576,854 (Schmidt et al.) discloses a compensator constructed for use in projector apparatus using an LCD with the conventional MacNeille prism type polarization beamsplitter. This compensator comprises a ¼ wave plate for compensating the prism and an additional $0.02\lambda$'s compensation for the inherent LCD residual birefringence effects.

While this prior art material extensively details the design of polarization compensators used under various conditions, compensators explicitly developed and optimized for use with wire grid polarizers and vertically aligned LCDs are not disclosed in the prior art. In order to achieve high brightness levels, it is most advantageous for an optical system to have a high numerical aperture (>~0.13), so that it is able to gather incident light at larger oblique angles. The conflicting goals of maintaining high brightness and high contrast ratio present a significant design problem for polarization components. Light leakage in the OFF state must be minimal in order to achieve high contrast levels. Yet, light leakage is most pronounced for incident light at the oblique angles required for achieving high brightness.

However, as is disclosed in commonly assigned co-pending U.S. patent application Ser. No. 10/040,663, polarization compensators have been developed and optimized for wire grid polarizers and polarization beam splitters. In particular, this application describes compensators designed for the wire grid devices, as well as compensators for wire grid devices which also work with vertically aligned LCDs and with compensators for vertically aligned LCDs. It has been shown that a modulation optical system comprising wire grid polarizers, a wire grid polarization beamsplitter, a vertically aligned LCD, and a customized polarization compensator, can provide polarization contrast in excess of the 1,000:1 target across a wide range of incident angles (small F's).

However, the fabrication of the polarization compensators used in such a system can be difficult, as, depending on the compensator design, specific values and orientations of retardance are required, and are assembled from a combination of existing materials. Typically these materials are thin film sheets, such as polycarbonate or acetate, whose optical retardance depends both on material properties and film fabrication methods. Compensators can then be assembled by stacking an appropriate combination of these films between glass plates, with intervening layers of optical adhesive to provide optical index matching. The assembled compensator must be free from both dirt and bubbles, and provide a consistent spatially uniform retardance while under a large heat (light) load. Alternately, a compensation layer with a nominal target retardance can be spun coated directly on a glass substrate, thereby potentially simplifying the construction of the compensator device. However, the construction of compensators that require multiple retardation layers with different properties can still be difficult. Furthermore, the optimum retardance required to correct for the inherent residual birefringence (such as the $0.02\lambda$'s mentioned previously) can vary significantly from device to device. Ideally, but likely impractically, this implies that to maximize contrast from device to device would require matching each LCD with an appropriately optimized compensator.

Given these various difficulties in providing robust uniform polarization compensators that maximize the polarization response of both the polarizers and the LCDs, it is evident that a design for a modulation optical system that simplifies the use of these compensator is an improvement. In general, the prior art does not describe how to design and optimize a modulation optical system for a projection display using both LCDs and wire grid polarization devices, which further has polarization compensators to boost contrast. Therefore, it can be seen that there is a need for an improved projection apparatus that uses wire grid polarization devices, vertically aligned LCDs, and polarization compensators in combination to provide high-contrast output. In particular, this invention will describe a modulation optical system, which can be used within projection display systems, printing systems, or for other applications, in which the wire grid polarizers are rotated slightly, in order to introduce retardance, and thus tune the performance of the LCD and polarization compensator, or simplify the design and construction of the polarization compensator, or provide a substitute for the polarization compensator, as depends on the design details of a given system.

SUMMARY OF THE INVENTION

Briefly, according to one aspect of the present invention a display apparatus comprises a light source for forming a beam of light. A pre-polarizer polarizes the beam of light to provide a polarized beam of light. A wire grid polarization beamsplitter receives the polarized beam of light and transmits the polarized beam of light which has a first polarization, and reflects the polarized beam of light which has a second polarization. A reflective spatial light modulator selectively modulates the polarized beam of light that has a first polarization to encode image data thereon in order to form a modulated beam and reflects the modulated beam back to the wire grid polarization beamsplitter. A compensator is located between the wire grid polarization beamsplitter and the reflective spatial light modulator for conditioning oblique and skew rays of the modulated beam. The wire grid polarization beamsplitter reflects the compensated modulated beam and the wire gird polarization beamsplitter is rotated in plane to optimize the contrast. A polarization analyzer removes residual light of the opposite polarization state from the compensated modulated beam. Image-forming optics form an image from the compensated modulated beam.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
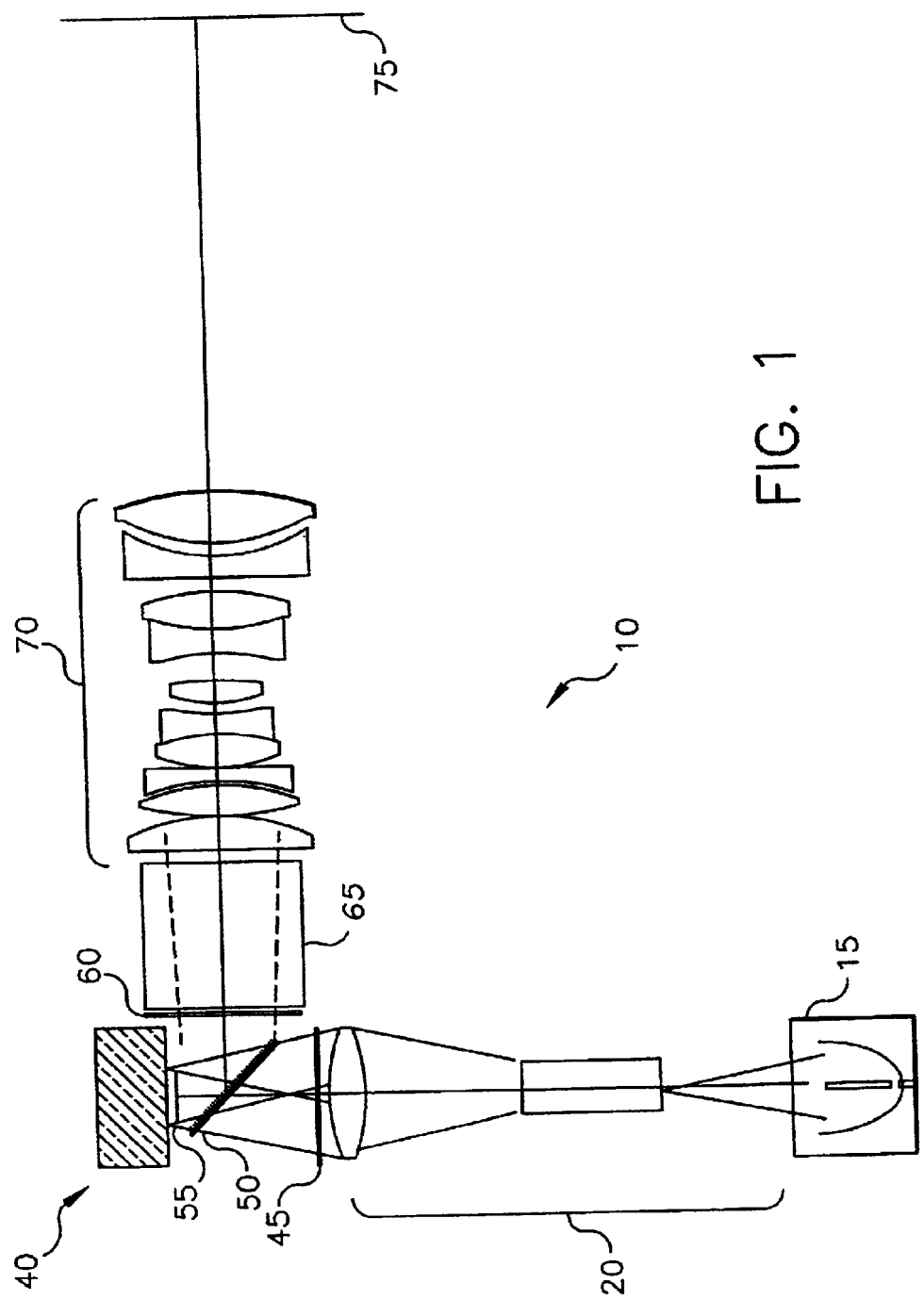
FIG. 1 is a schematic view showing an arrangement of optical components in a projection apparatus.

Referring to FIG. 1, there is shown in schematic form the arrangement of optical components in a digital projection apparatus 10, as described in commonly-assigned copending U.S. patent application Ser. No. 09/813,207. Illumination optics 20 and pre-polarizer 45 precondition light from a light source 15 to provide illumination that is essentially uniformized and polarized. Illumination optics 20 includes uniformizing optics, such as an integrating bar or a fly's eye integrator assembly, and condensing relay optics assembly. This light is subsequently polarized by pre-polarizer 45, with light of the desired polarization state directed towards the polarization beamsplitter, while the rejected alternate polarization state light nominally reflects back towards the light source. Pre-polarizer 45 is part of modulation optical system 40, which also comprises a wire grid polarization beamsplitter 50, a polarization altering spatial light modulator 55, and a polarization analyzer 60. Nominally, wire grid polarization beamsplitter 50 transmits the incident light having the preferred polarization state, while reflecting residual incident light having the alternate polarization state out of the system. Incident light is modulated by spatial light modulator 55, which is nominally a liquid crystal display (LCD), to encode a two-dimensional image onto the light, which is then reflected as a modulated light beam. Wire grid polarization beamsplitter 50 reflects light from the modulated light beam having one polarization state, and transmits the light having the alternate polarization state. Projection optics 70 then directs the reflected modulated light beam onto a display surface 75, which is nominally a projection screen. Typically, the visible light emitted by the light source 15 is split into three color channels (red, green, blue), where the light in each channel interacts with its own modulation optical system 40, including its own spatial light modulator 55. These channels can be recombined for projection to the display surface 75 by a recombination prism 65.

Figure 2:
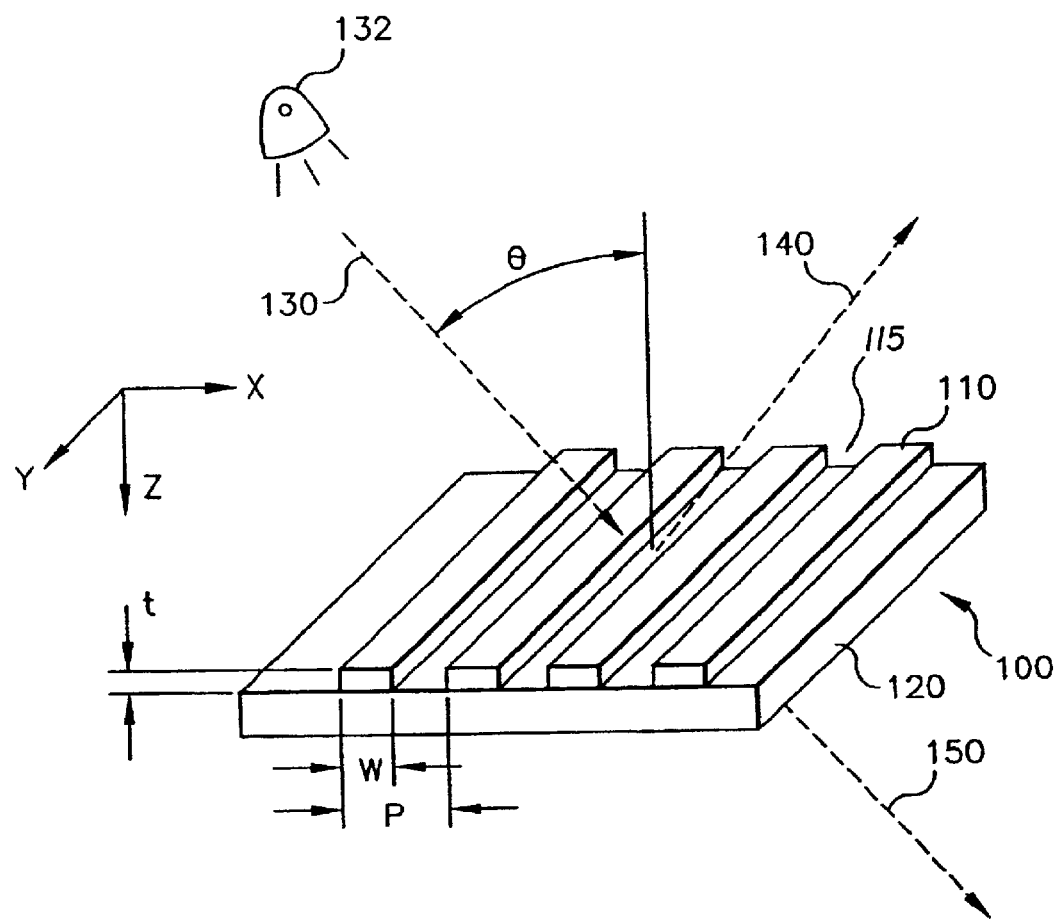
FIG. 2 is a perspective view of a prior art wire grid polarizer.

The design of digital projection apparatus 10 and modulation optical system 40 both can be better understood from a deeper discussion of the properties of the wire grid polarizers used within these systems. FIG. 2 illustrates a basic prior art wire grid polarizer and defines terms that will be used in a series of illustrative examples of the prior art and the present invention. The wire grid polarizer 100 is comprised of a multiplicity of parallel conductive elements (wires) 110 and grooves 115 supported by a dielectric substrate 120. This device is characterized by the grating spacing or pitch or period of the conductors, designated (p); the width of the individual conductors, designated (w); and the thickness of the conductors, designated (t). A wire grid polarizer uses sub-wavelength structures, such that the pitch (p), conductor or wire width (w), and the conductor or wire thickness (t) are all less than the wavelength of incident light ($\lambda$). While the wire thickness (t) can actually exceed the wavelength, for most designs, that is not the case. A beam of light 130 produced by a light source 132 is incident on the wire grid polarizer 100 at an angle $\theta$ from normal, with the plane of incidence orthogonal to the conductive elements. The wire grid polarizer 100 divides this beam into specular non-diffracted outgoing light beams; reflected light beam 140 and transmitted light beam 150. The definitions for S and P polarization used are that S polarized light is light with its polarization vector parallel to the conductive elements, while P polarized light has its polarization vector orthogonal to the conductive elements. In general, a wire grid polarizer will reflect light with its electric field vector parallel ("S" polarization) to the grid, and transmit light with its electric field vector perpendicular ("P" polarization) to the grid. Wire grid polarizer 100 is a somewhat unusual polarization device, in that it is an E-type polarizer in transmission (transmits the extraordinary ray) and O-type polarizer in reflection (reflects the ordinary ray).

When such a device is used at normal incidence ($\theta=0$ degrees), the reflected light beam 140 is generally redirected towards the light source 132, and the device is referred to as a polarizer. However, when such a device is used at non-normal incidence (typically $30°<\theta<60°$), the illuminating beam of light 130, the reflected light beam 140, and the transmitted light beam 150 follow distinct separable paths, and the device is referred to as a polarization beamsplitter. The detailed design of a wire grid device, relative to wire pitch (p), wire width (w), wire duty cycle (w/p), and wire thickness (t), may be optimized differently for use as a polarizer or a polarization beamsplitter. It should be understood that both digital projection apparatus 10 and modulation optical system 40, when designed with polarization modifying spatial light modulators, may use polarization analyzers and polarization beamsplitters other than wire grid type devices. For example, the polarization beamsplitter may be a MacNeille type glass prism, or the polarizer may be either a dye/polymer based sheet polarizer. However, for this discussion, the polarization beamsplitter 50, pre-polarizer 45, and polarization analyzer 60 are all generally assumed to be wire grid devices, although that is not required for all configurations for the projector.

Figure 3:
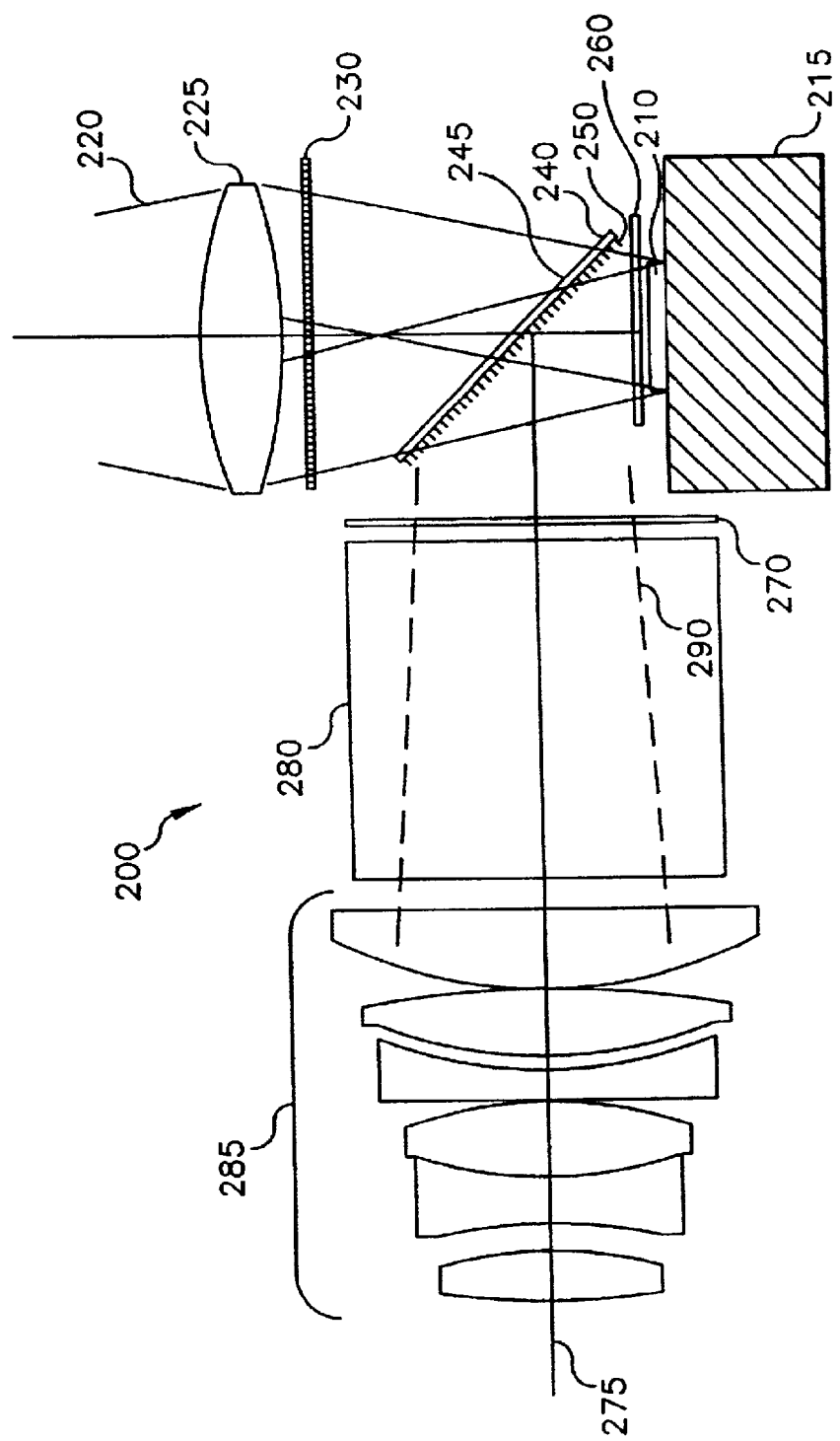
FIG. 3 is a cross sectional view showing a modulation optical system which includes a wire grid polarization beamsplitter.

The preferred spatial relationships of these polarizers, as used in a modulation optical system 200, are illustrated in FIG. 3. Modulation optical system 200 is an expanded and more detailed version of the modulation optical system 40 of FIG. 1. The basic structure and operation of modulation optical system 200 is described in the previously cited commonly-assigned copending U.S. patent application Ser. No. 09/813,207. Modulation optical system 200, which is a portion of an electronic projection system (or a printer system), comprises an incoming illumination light beam 220, which is focused through pre-polarizer 230, wire grid polarization beamsplitter 240, and compensator 260, and onto spatial light modulator 210 (the LCD) by a condensor 225. Modulated image-bearing light beam 290 is reflected from the surface of spatial light modulator 210, transmitted through compensator 260, reflected off of wire grid polarization beamsplitter 240, and is then transmitted through polarization analyzer 270. After exiting modulation optical system 200, modulation image bearing light beam 290 follows along optical axis 275, and is transmitted through recombination prism 280 and projection lens 285 on its way to the screen (or to a photo-sensitive media). Again, pre-polarizer 230 and polarization analyzer 270 are assumed to both be wire grid polarization devices. A full color projection system would employ one modulation optical system 200 per color (red, green, and blue), with the color beams re-assembled through the recombination prism 280. Condensor 225, which may comprise several lens elements, is part of a more extensive illumination system which transforms the source light into a rectangularly shaped region of nominally uniform light which nominally fills the active area of spatial light modulator 210.

In a modulation optical system 200 utilizing a prior art wire grid polarization beamsplitter, the wire grid polarization beamsplitter 240 consists of a dielectric substrate 245 with sub-wavelength wires 250 located on one surface (the scale of the wires is greatly exaggerated). Wire grid polarization beamsplitter 240 is disposed for reflection into projection lens system 285, thereby avoiding the astigmatism and coma aberrations induced by transmission through a tilted plate. Most simply, compensator 260 is a waveplate which provides a small amount of retardance needed to compensate for geometrical imperfections and birefringence effects which originate at the surface of spatial light modulator 210. For example, as discussed in U.S. Pat. No. 5,576,854 (Schmidt et al), compensator 260 may provide 0.02λ's of retardance (A-plate) to correct for polarization errors caused by residual geometrical imperfections of the LCD polarizing layer and residual thermally induced birefringence within the counter electrode substrate within the LCD package. In less demanding applications than digital cinema, compensator 260 may prove optional.

The construction of modulation optical system 200, as used for digital cinema, is defined both by the system specifications and the limitations of the available wire grid polarizing devices. In particular, digital cinema requires the electronic projector to provide high frame sequential system contrast (1,000:1 or better). To accomplish this, the polarization optical components, excluding spatial light modulator 210 (the LCD) of modulation optical system 200 must provide a total optical system contrast (Cs) of ~2,000:1. The actual target contrast for the polarization optics of course depends on the performance of the LCDs. Thus, if the LCDs provide only ~1500:1 contrast, then the polarization optics must provide ~3,000:1 contrast. For digital cinema, LCDs with vertically aligned (VA) molecules are preferred due to their high innate contrast. Notably, the contrast performance of both the LCDs and the polarization optics typically decrease with increasing numerical aperture of the incident beam. Unfortunately, with today's technologies it is not sufficient to use just a single wire grid polarization beamsplitter 240 by itself in order to meet the 2,000:1 target contrast for the polarization optics. For this reason, modulation optical system 200 also uses a wire grid pre-polarizer 230 and a wire grid polarization analyzer 270 to provide the target polarization performance.

The construction and operation of modulation optical system 200 can be understood in yet greater detail, relative to its polarization performance. Preferably, pre-polarizer 230 is oriented to transmit "P" polarized light into the modulation optical system. Wire grid polarization beamsplitter 240 is oriented with its sub-wavelength wire pattern oriented nominally parallel to the sub-wavelength wires of polarizer 230 (that is, the two devices are not crossed). Thus, the transmitted "P" light is further modified (contrast enhanced) by transmission through the wire grid polarization beamsplitter 240. The transmitted light beam then passes through compensator 260 and encounters spatial light modulator 210, which is nominally a reflective LCD, which modifies the polarization state of the incident light on a pixel to pixel basis according to the applied control voltages. Intermediate code values, between white and black, reduce the amount of "On" state and increase the amount of "Off" state light. The "On" state light, which has been polarization rotated, is in the "S" polarization state relative to the wire grid beamsplitter 240. Thus the "S" state light reflects off the wire grid polarization beamsplitter 240, is subsequently transmitted through polarization analyzer 270, and directed to the screen by a projection lens 285. The overall contrast (Cs) for modulation optical system 200 (ignoring the LCD and compensator contributions) can be approximated by:

$$1/Cs = 1/(C_{T1} * C_{T2}) + 1/(C_{R2} * C_{T3})$$

where $C_{T1}$ is the transmitted contrast of the wire grid pre-polarizer 230, $C_{T2}$ and $C_{R2}$ are transmitted and reflected contrast ratios for the wire grid polarization beamsplitter 240, and $C_{T3}$ is the transmitted contrast for the wire grid polarization analyzer 270. In this system, the overall contrast is largely determined by the low reflected contrast ratio $C_{R2}$ for "S" polarization state light off of wire grid polarization beamsplitter 240. The analyzer contrast $C_{T3}$ needs to be quite high to compensate for the low $C_{R2}$ values (~30:1). Whereas the transmitted contrasts $C_{T1}$ and $C_{T2}$ do not need to be particularly high, provided that the respective contrast values are reasonably uniform over the spectrum. Polarization analyzer 270 is oriented so that the "On" state light, which reflects off the wire grid polarization beamsplitter 240 and has "S" polarization relative to the wire grid polarization beamsplitter 240, sees this same light as "P" state light relative to its own structure. Polarization analyzer 270 therefore removes any alternate polarization leakage light accompanying the desired "On" state beam. As an example, for green light at 550 nm, the combination of wire grid polarization beamsplitter 240 and wire grid pre-polarizer 230 provide an on screen frame sequential optical contrast ratio of only ~25:1. However, when these polarizers are complemented with wire grid polarization analyzer 270, the theoretical overall system contrast Cs is boosted to ~2900:1.

Modulation optical system 200 is best constructed with wire grid polarization beamsplitter 240 oriented with the surface with the sub-wavelength wires 250 facing towards the spatial light modulator 210, rather than towards the illumination optics (condenser 225) and light source (see FIG. 3). While the overall contrast (Cs) is ~2,900:1 when this orientation is used, the net contrast drops precipitously to ~250:1 when the alternate orientation (wires on the surface towards the light source) is used. (Note: spatial light modulator 210 (LCD) is replaced by a mirror and a quarter wave plate for this test). This fall off in contrast is caused by stress birefringence in the glass substrate, which can be due to the innate qualities of the glass itself, or from thermally induced stress birefringence from light absorption. In the preferred orientation, with glass substrate 245 positioned with the sub wavelength wires 250 facing towards the spatial light modulator 210, the modulated image bearing light beam 290 reflects from the wires without encountering the substrate and any stress birefringence within it, thus maintaining the high contrast. Modulation optical system 200 also provides the highest contrast and light efficiency when the sub-wavelength wires 250 of wire grid polarization beamsplitter 240 are oriented "vertically" ("into the page", as shown), rather than "horizontally" (within the plane of the page).

In order to build a digital cinema projector it is necessary to simultaneously maximize luminance (10,000–15,000 lumens) and contrast (1,000:1+) with a system illuminating 35–55 ft. wide screens, while dealing with the limitations of the various optics, wire grid devices and LCDs. Luminance can be maximized by increasing the acceptance angle (numerical aperture) of light incident at the wire grid polarization beamsplitter and the LCD. Modeling suggests that an LCD based digital cinema projector will need to operate below F/3.0 to meet the screen luminance targets, with systems speeds of F/2.0 to F/2.3 being potentially required. However, the wider angles of source light incident at wire grid polarization beamsplitter, will increase the leakage light from other polarization states, and thus reduce the available contrast. Measurements have shown that the contrast for modulation optical system 200 (including wire grid pre-polarizer 230, wire grid polarization beamsplitter 240, a VA LCD, and a wire grid polarization analyzer 270) at ~F/2.3 is only ~500:1, when the system is assembled without the polarization compensators.

Figure 4:
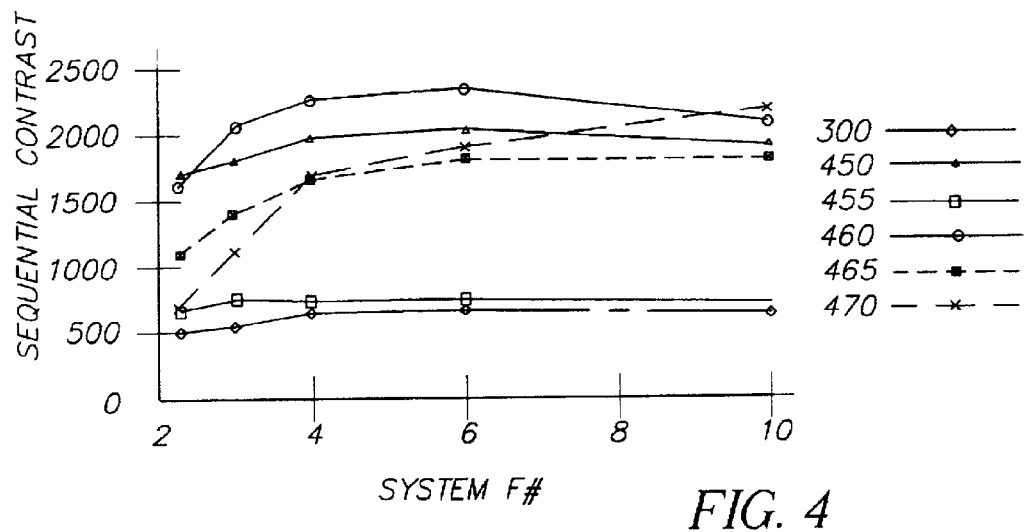
FIG. 4 is a series of plots showing the relationship of contrast to F# for a modulation optical system which includes both a wire grid polarization beamsplitter and a LCD, as measured under various cases of polarization compensation.

In particular, as shown in FIG. 4, where the uncompensated system contrast 300 is plotted vs. F#, the measured contrast at F/2.3 for modulation optical system 200 assembled with a VA LCD used for spatial light modulator 210, but without a compensator 260, is only ~490:1. Furthermore, the uncompensated system contrast 300, as measured with this one particular VA-LCD (device "A"), remains low (only ~630:1) out to F/10.

Figure 6A:
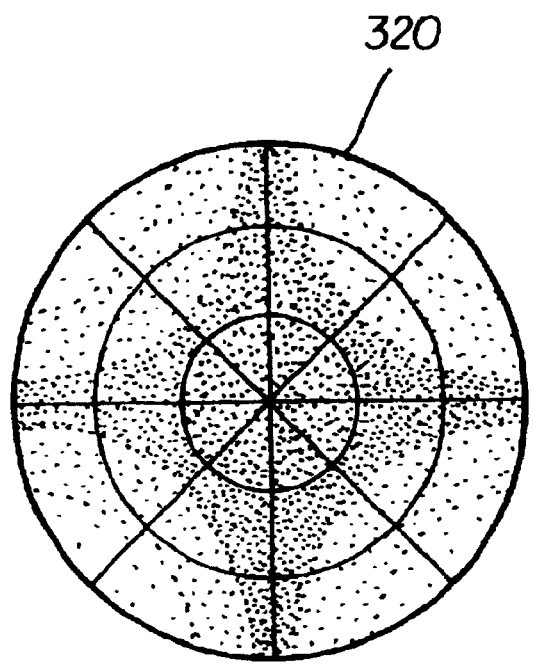
FIGS. 6a and 6b show the angular response for crossed wire grid polarizers without polarization compensation.

While the polarization contrast can be degraded by numerous contributors within modulation optical system 200, this contrast loss can also be evidenced in several ways. FIG. 6a illustrates the polarization contrast profile for crossed polarizers, visible in angular space as an iso-contrast plot, and known as the "iron cross." The iron cross pattern 320 demonstrates peak extinction in directions parallel and perpendicular to the grid of the analyzer, and diminished extinction for the skew rays and oblique rays in the four off-axis quadrants. As the wire grid polarization beamsplitter has superior angular performance when compared to most existing polarizers, these devices have been generally considered to not have a skew ray problem, and therefore to not require further polarization compensation. This is in part because the wire grid polarization beams splitter functions as an O-type polarizer in reflection and an E-type polarizer in transmission, and therefore is partially self compensating when used in both transmission and reflection as in modulation optical system 200.

Figure 6B:
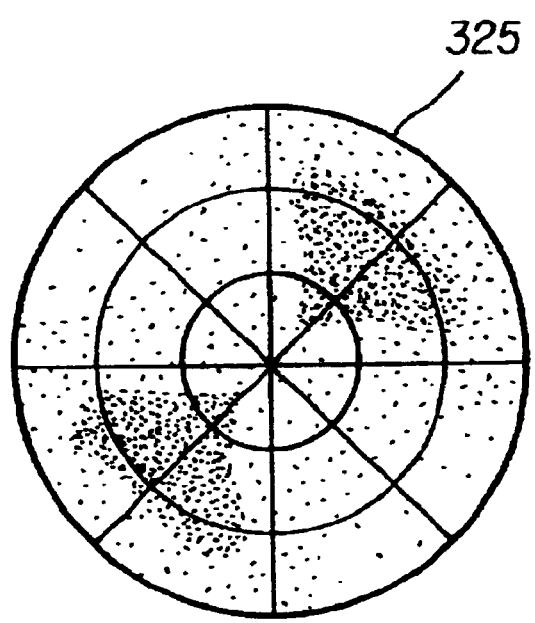

The "iron cross" illustration of FIG. 6a also represents the nominal polarization response of an ideal VA LCD, as seen through crossed polarizers, assuming it has a negligible internal tilt angle from the vertical, relative to molecular alignment. Unfortunately, contrast can also be degraded by various subtle effects within the VA-LCDs, such large tilt angles, OFF state bias voltages, thermally induced stresses, and large incident angles (large NA's). These effects can cause the contrast to be generally reduced while the iron cross pattern 320 is retained, or cause the iron cross pattern 320 to be deformed into another extinction pattern (such as the "baseball" pattern 325 shown in FIG. 6b). For example, just 3–4 nm of residual XY retardance within a VA LCD can cause the device to output the baseball pattern 325 rather than an iron cross pattern 320. As the iso-contrast departs more and more from the iron cross pattern, the total integrated contrast typically drops as well. Contrast degradation from the wire grid polarization beamsplitter 240, from effects such as wire surface orientation, wire rotation, and large incident angles, can also degrade the iron cross pattern 320 in similar ways.

Figure 5A:
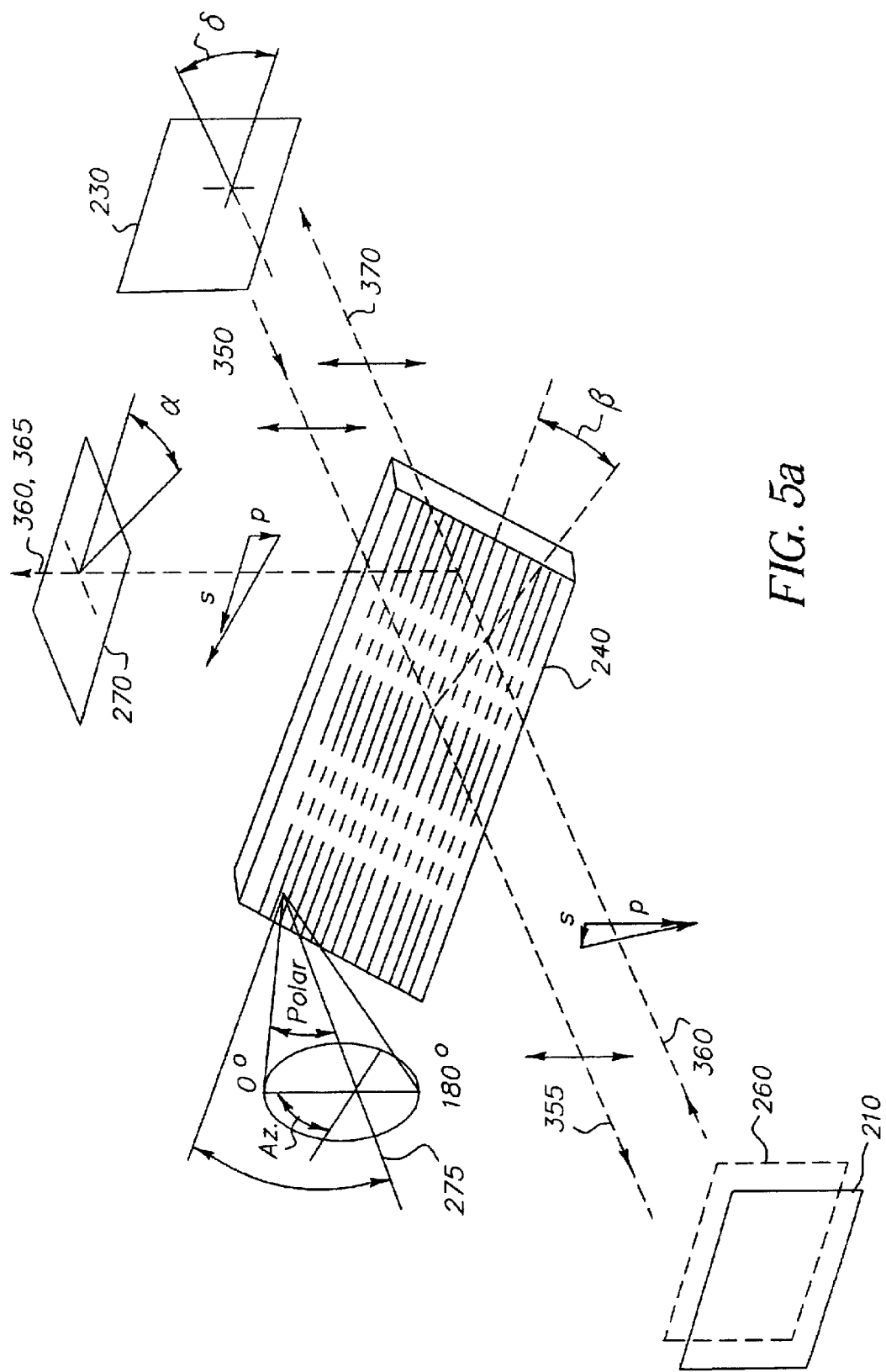
FIG. 5a shows the geometry of incident light relative to the wire grid polarization beamsplitter and a LCD within a modulation optical system, illustrating both polarization states and the local beam geometry.

This can be better understood by considering how polarized light traverses modulation optical system 200. FIG. 5a, shows a perspective view representing light polarization states for light reflected by and transmitted through wire grid polarization beamsplitter 240 within the modulation optical system, for a portion of LCD 210. A pre-polarized beam 350 is transmitted through wire grid polarization beamsplitter 240. As shown in FIG. 5a, the electric field polarization of transmitted beam 355 is on a vector perpendicular to the wire grid of wire grid polarization beamsplitter 240. A returning modulated beam 360 is reflected from the pixel on LCD 210, where the "S" polarized light is the image data, and the "P" polarized light is to be rejected. Ideally, wire grid polarization beamsplitter 240 transmits 100% of the unwanted "p" light as a modulated transmitted light 370. However, a small leakage light 365 is reflected from wire grid polarization beamsplitter 240 and accompanies "s" modulated beam 360, causing reduced contrast (ratio of "s" to "p"). The magnitude of the leakage light 365 is further reduced by the wire grid polarization analyzer 270. Relative to the modulated beam 360, wire grid beamsplitter acts as a pre-polarizer in transmission and a polarization analyzer in reflection, in a sense comprising the typical crossed polarizer configuration.

Figure 5B:
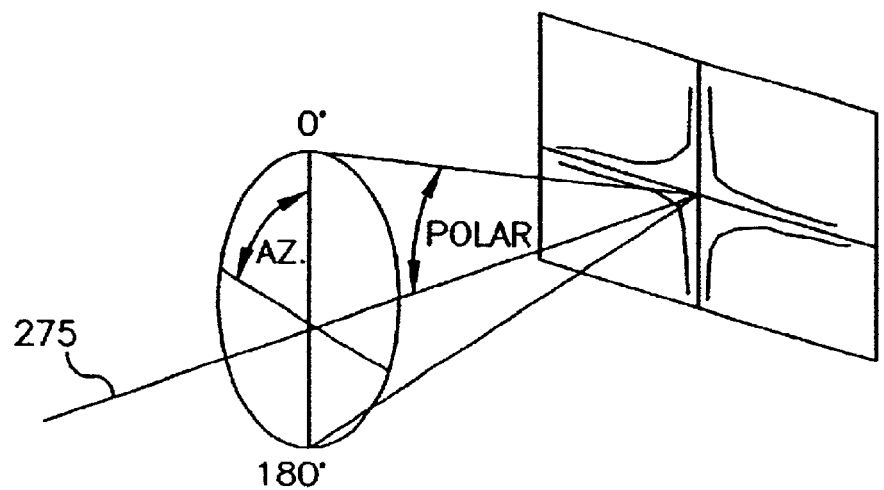
FIG. 5b illustrates the geometry of normally incident light relative to the polarization states of crossed polarizers.

While some loss of polarization contrast does occur with on axis collimated light, the effects are more dramatic for oblique and skew rays. To better understand this, FIG. 5a includes an illustration of the beam geometry for a large NA non-specular beam incident on a 45° tilted surface of wire grid polarization beamsplitter 240, while FIG. 5b shows the geometry for a similar non-specular beam incident normal to a surface (such as the LCD 210, pre-polarizer 230 or analyzer 270). For the normally incident case, the incoming beam is described by an azimuthal sweep of 0–180°, while the polar sweep of angles is limited (0–15° for F/2.0). The oblique rays are those rays that fall in the four quadrants outside the axes (azimuthal angles 0° and 180°, 90° and 270°) defined by the crossed polarizers, and which lie in planes which contain the local optical axis 275. The skew rays are the rays that lie in planes that do not contain the local optical axis 275. For the case of incidence to the 45° tilted surface, the incoming beam is again defined by an azimuthal sweep of 0–180°, while the polar sweep of angles covers ~0–15° relative to the optical axis, or a sweep of ~30–60° relative to the wire grid surface. It is these oblique and skew rays which account for the reduced contrast observed in the four quadrants of iron cross pattern 320. For example, peak contrast along the axes can exceed 1,000:1, while contrast in the four quadrants located 45 degrees off the crossed coordinate axes falls off to 300:1 or less.

As noted previously, modulation optical system 200, which partially comprises a wire grid pre-polarizer 230, a wire grid polarization beamsplitter 240, a vertically aligned LCD 210, and a wire grid polarization analyzer 270, nominally provides only ~500:1 contrast in the green at F/2.3, which is below specification. However, as one solution, the system contrast can be enhanced, to meet and exceed specification, through the use of the appropriate compensators.

Figure 7C:
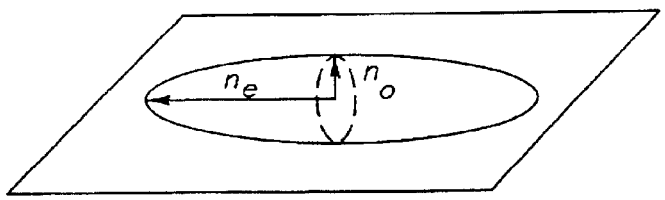
FIGS. 7a–7e show the possible axial orientations and construction of a polarization compensator.
Figure 7D:
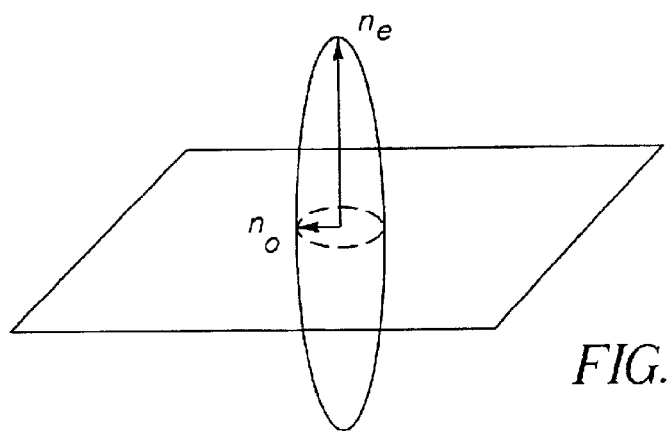
Figure 7E:
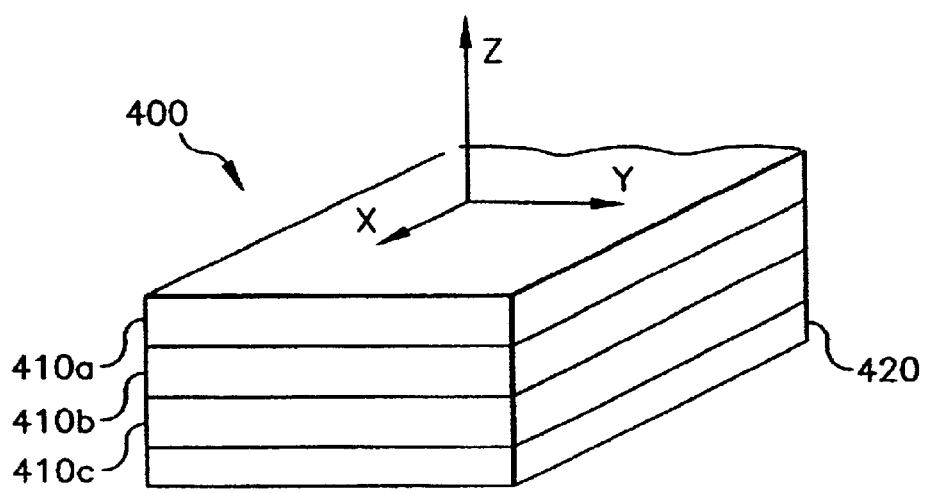
Figure 7A:
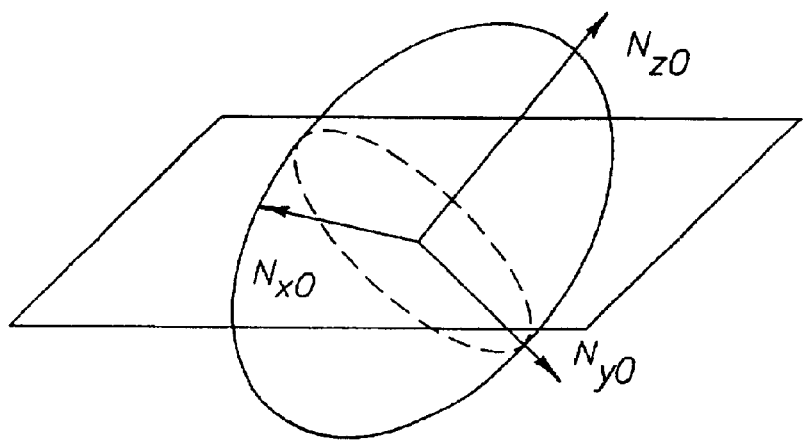
Figure 7B:
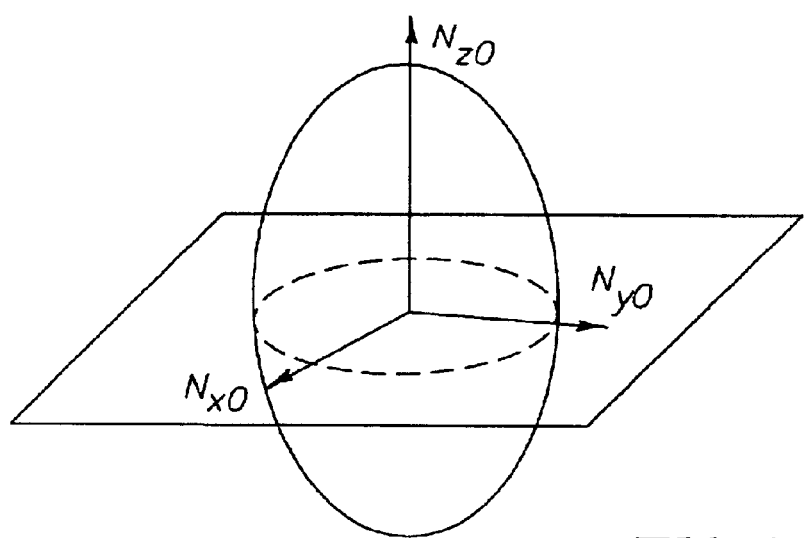

Compensators and polarizers are constructed from birefringent materials, which have multiple indices of refraction. Comparatively, isotropic media (such as glass) have a single index of refraction, and uniaxial media (such as liquid crystals) have two indices of refraction. Optical materials may have up to three principle indices of refraction. The materials with all three different refractive indices are called biaxial, and are uniquely specified by its principal indices $nx_0$, $ny_0$, $nz_0$, and three orientational angles as shown in FIG. 7a. FIG. 7b shows a biaxial film with the axes of $nx_0$, $ny_0$, and $nz_0$ aligned with x, y, and z axes, respectively. Materials with two equal principal refractive indices are called uniaxial materials (see FIG. 7c). These two equal indices are ordinary index and referred as $n_o$. The other different refractive index is called an extraordinary index $n_e$. The axis of $n_e$ is also referred to as a compensator optical axis. Uniaxial materials are uniquely characterized by $n_e$, $n_o$, and two angles describing the orientation of the compensator optical axis. When all three principal indices are equal, the materials are called isotropic.

Light sees varying effective indices of refraction depending on the polarization direction of its electric field when traveling through a uniaxial or biaxial material, consequentially, a phase difference ($\Delta\phi$) is introduced between two eigen-modes of the electric field. This phase difference varies with the propagation direction of light, so the transmission of the light varies with angle when uniaxial or biaxial materials are placed between two crossed polarizers. These phase differences $\Delta\phi$ translate into modifications of the local polarization orientations for rays traveling along paths other than along or parallel to the optical axis. In particular, a compensator generally modifies or conditions the local polarization orientations for rays at large polar angles, which also includes both oblique and skew rays. A liquid crystal material is typically a uniaxial material. When it is sandwiched between two substrates as in a liquid crystal display, its optic axis generally changes across the thickness depending on its anchoring at the substrates and the voltage applied across the thickness.

A compensator is constructed with one or more uniaxial and/or biaxial films, which are designed to introduce angularly dependent phase differences in a way to offset the angularly dependent phase differences introduced by liquid crystals or other optics. As is well known in the art, a uniaxial film with its optic axis parallel to the plane of the film is called an A-plate as shown in FIG. 7c, while a uniaxial film with its optic axis perpendicular to the plane of the film is called a C-plate, as shown in FIG. 7d. Alternately, the A-plate can be described as providing XY birefringence (an anisotropic medium with XY retardance) in the plane of the compensator, while the C-plate provides Z birefringence along the optical axis in the direction of beam propagation. A uniaxial material with $n_e$ greater than $n_o$ is called positively birefringent. Likewise, a uniaxial material with $n_e$ smaller than $n_o$ is called negatively birefringent. Both A-plates and C-plates can be positive or negative depending on their $n_e$ and $n_o$. A more sophisticated multi-layer compensator 400 has its optic axis or three principal index axes varying across its thickness, as in FIG. 7e, where a stack of compensation films (birefringent layers 410a, 410b, and 410c) are used with a substrate 420 to assemble the complete compensator. A detailed discussed of stack compensation can be found in U.S. Pat. No. 5,619,352 (Koch et al.). As is well known in art, C-plates can be fabricated by the use of uniaxially compressed polymers or casting cellulose acetate, while A-plates can be made by stretched polymer films such as polyvinyl alcohol or polycarbonate.

As discussed in commonly assigned co-pending U.S. patent application Ser. No. 10/040,663, polarization compensators can be specifically designed to enhance the polarization angular response of both the wire grid polarizers and the wire grid polarization beamsplitters. As discussed in that application, modeling of a typical visible wavelength wire grid polarizer, using the rigorous coupled wave analysis (RCWA) methodology shows a significant increase in light transmission versus angle. These wire grid polarizers were modeled as aluminum wire structures, deposited on Corning glass 1737F, with a wire pitch of 144 nm (~λ/4), a wire duty cycle of 0.45, and a wire height of 130 nm. In the green wavelength band (550 nm), the transmission at 20 deg. (F/1.5) and a 45 deg. azimuthal angle (corresponding to the off axis quadrants the iron cross pattern 320 of FIG. 6a) is 2.5× larger than it is at a polar angle of 0 deg. At even larger polar angles (40 deg.) the transmission (leakage light) can be ~10× larger than it is on axis. As contrast is approximately inversely proportional to the transmission for crossed polarizers, such increases in transmitted light (light leakage) can cause huge changes in system contrast.

As further discussed in U.S. patent application Ser. No. 10/040,663, exemplary polarization compensators were designed to enhance the performance for both crossed wire grid polarizers (pre-polarizer 230 and analyzer 270 of FIG. 3) and for the wire grid polarization beamsplitter 240. In particular, exemplary polarization compensators were designed to optimize the combined transmission performance versus angle for the wire grid polarization beamsplitter 240 oriented at 45°. One such compensator was designed as a combination of two specific birefringent films, a +90 nm A-plate and a +320 nm C-plate. With this compensator, the transmission of the Off state light (leakage light) at azimuthal angles of 45 deg. was reduced by ~2× or more, throughout a range of large polar angles spanning 15° to 30°, as compared to the un-compensated wire grid polarization beamsplitter. Meanwhile, the on-axis transmission was unaffected (not degraded), as the compensated and uncompensated values remained the same. Using this compensator effectively alters the iron cross pattern 320 of FIG. 6a to be "black" (high contrast light extinction) over a larger angular range.

Within the layered structure of that exemplary compensator, the A-plate is preferentially located closer to the wire grid polarization beamsplitter than the C-plate, which is closer to the LCD. The optical axis of A-plate is parallel to the transmission axis of the adjacent polarizer (perpendicular to the wires). This compensator is represented by compensator 260 in modulation optical system 200 of FIG. 3, and is located between wire grid polarization beamsplitter 240 and liquid crystal spatial light modulator 210. This is the only acceptable location for this compensator within modulation optical system 200.

It should be understood that the compensators, whether for the wire grid polarizers, or for the wire grid polarization beamsplitters, can be designed any number of ways. For example, a single biaxial film can be used to replace the combination of A-plate and C-plate. Likewise, the compensators can be designed in reverse order, with a C-plate encountered before the A-plate. However, when the order is switched, the designed birefringence values likely change. It is also understood that additional A-plate and/or C-plate and/or biaxial films can be added to a prior A-plate and C-plate compensator design. The compensators may be constructed with their birefringent films sandwiched between two glass substrates, with optical matching adhesives or gels holding the elements together. In that case, any glass to air surfaces should be AR coated.

Similarly, as discussed in the Mi et al. application, the overall contrast performance of modulation optical system 200 of FIG. 3 can be enhanced by providing polarization compensators which enhance the performance of the LCDs as seen through the wire grid polarization beamsplitter. This is similar in concept to the prior art example of U.S. Pat. No. 5,576,854 (Schmidt et al.), where a compensator is described which optimizes for the VA LCD working in combination with a MacNeille beamsplitter. As disclosed in that patent, a 0.27λ compensator is used, where 0.25λ's compensate for the MacNeille prism and 0.02λ's for residual stress birefringence in the counter electrode substrate of the LCD. Thus, for the current circumstance, where the vertically aligned LCD is combined with a wire grid polarization beamsplitter, the 0.25λ's retardance used to compensate for the MacNeille type prism is not required. However, the residual 0.02λ's retardance (~11 nm XY), which is provided as an A-plate, can still be useful to correct to stress birefringence within the VA LCD, even when a wire grid beamsplitter is used.

The design of polarization compensators for use with VA-LCDs within a modulation optical system 200 for digital cinema was also considered in the prior cited application (Mi et al.). It was noted that modulation optical system 200 places the VA LCD in an unusually fast optical system (approx. <F/3.0). In that case, a negative C-plate may be used to correct the viewing angle dependence of the liquid crystal. This negative C-plate should have same amount of Z retardation as the VA-LCD, which may typically be ~160–300 nm. Thus, in this case, the preferred compensator for reflective VA LCD's, used in fast beams in combination with a wire grid polarization beamsplitter, comprises both a negative C-plate (−233 nm retardance for example) and a rotatable positive A-plate (~11 nm retardance for example).

Again, when an ideal, or near ideal, VA-LCD is viewed through crossed polarizers in the Off State, the iso-contrast shows an "iron cross" pattern 320, similar to that of FIG. 6a. This pattern indicates that there is minimal light along the optical axis (center of the spherical pattern) and along the directions parallel or perpendicular to the transmission axis of the crossed polarizers, but that there is leakage light can be expected in the four quadrants. However, the modeled polarization extinction with F/2.3 illumination at an azimuthal angle of 45° for an uncompensated ideal VA-LCD located between crossed polarizers, exceeds ~1,000:1 out to a polar angle of only ~3.5°. By comparison, the same VA-LCD modeled with a proper C-plate compensator (−233 nm retardance) to boost contrast for fast light beams, was modeled to have contrast levels of 1,000:1 out to more than a 13° polar angle. Similar improvements can be obtained for non-ideal VA-LCDs, such as those with significant residual XY retardance (11 nm for example), which by themselves give the degenerate iso-contrast baseball pattern 325 when viewed through crossed polarizers. When such an LCD is paired with a properly designed (with a −233 nm C-plate and 11 nm A-plate for example) polarization compensator, the contrast is significantly enhanced over a wide angular range.

Depending on the designed performance of the polarization compensator, the polarizers, and the specific properties of a given LCD, the enhanced contrast can be exhibited in different ways in the far field. For example, the polarization compensator can alter an iron cross iso-contrast (as in FIG. 6a) to be a "darker" iron cross, with the high contrast extinction extending to higher angles, particularly in the four quadrants. Alternately, the polarization compensator can also alter the iso-contrast to appear as a nominally circular area covering a large angular sweep of angles in which the contrast is uniformly dark. Likewise, a modulation optical system using an uncompensated LCD providing an iso-contrast baseball pattern, can provide either a dark iron cross or a dark uniform spherical iso-contrast pattern, when a properly matched polarization compensator is used. The polarization compensator for the VA-LCD can be inserted into the modulation optical system 200 of FIG. 3, immediately prior to the LCD 210, as compensator 260.

As was also discussed in the prior cited application (Mi et al.), the polarization compensators for the wire grid polarization beamsplitter 240 and the LCD 210 are co-located between these two components, and can be combined into one packaged compensator device (compensator 260). Moreover, an integrated compensator can be used, which includes a single C-plate where the net retardance is determined from the calculated C-plate retardances for the VA-LCD compensator and the wire grid polarization beamsplitter compensator. The net C-plate retardance may be smaller or larger, depending on the sign (positive or negatively birefringent) of the input C-plate values. In the prior examples, the C-plate compensator for the wire grid polarization beamsplitter had +320 nm retardance, while the C-plate compensator for the VA-LCD had −233 nm birefringence. Thus, when these two C-plate designs are combined, the remaining C-plate has only ~87 nm retardance. The combined compensator 260 then comprises the 11 nm A-plate for the VA LCD (0.02λ's compensation), the 87 nm C-plate, and the 90 nm A-plate for the wire grid polarization beamsplitter 240 in sequential order, with the 11 nm A-plate located closest to the LCD 210. The two A-plates cannot be simply combined, as the 11 nm A-plate needs to be rotatable, while the 90 nm A-plate has a fixed orientation relative to the sub-wavelength wires 250. All or a portion of the compensator 260 may be rotated to optimize the contrast or light efficiency or both.

Considering again FIG. 4, the XYZ compensated system contrast 450 is shown for the case of modulation optical system 200 tested with a VA-LCD and a polarization compensator 260. In this example, the VA-LCD was the same one (device "A") used to collect the data for the uncompensated system contrast 300, and the compensator 260 specifically consisted of a 180 nm C-plate (for Z) and a 12 nm A-plate (for XY). (Note: this compensator incorporates the exemplary correcting retardances for the VA-LCD only, and not the exemplary retardances for correcting the wire grid polarization beamsplitter.) As can be seen by comparing the uncompensated system contrast 300 to the XYZ compensated system contrast 450, the measured contrast at F/2.3 is improved dramatically, to ~1670:1. Moreover, for this device "A" VA-LCD and compensator combination, the contrast is dramatically improved from F/2.3 to F/10, as it remains above 1600:1 over the entire range.

As can be seen, the polarization compensators suggested in the prior application (Mi et al.) require fairly complicated structures. This is true, whether the design of compensator 260 has oriented layers that correct for the VA-LCD, the wire grid polarization beamsplitter, or the two in combination. The successful fabrication of the compensator depends on the material properties of the constituent films, the number of layers used, the preferential orientation of the layers, and the properties of the glass and adhesives that are used. Moreover, an assembled compensator may work at low light levels, but fail at high light levels, due to the increased thermal load. This can be problematic for high lumen projection systems, such as those for digital cinema. Additionally, it is also difficult to reliably fabricate very small retardances, such as the 11 nm A-plate retardance described for use with VA-LCDs. Moreover, in practice, these target retardances given previously (such as the −233 nm C plate and the 11 nm A plate) are nominal only, and the optimum retardance values vary considerably from one device to the next, even across a run of nominally identical devices. For example, a small sample of three VA-LCDs were tested, and it was determined that to optimize contrast, one device (device "A") required ~11–12 nm of XY retardance, while another (device 'B") required only ~2–3 nm of XY retardance, and the third device ("C") needed >18 nm XY retardance. The ideal Z retardances for these devices varied as well, although over a lesser range. Relative to the manufacture of modulation optical system 200, it may prove impractical or prohibitively expensive to match specific compensators with specific LCDs in order to optimize the contrast performance of each device.

Indeed, the presence of an A-plate with the correct XY polarization compensation can be critical in achieving the required contrast performance for some LCDs. The contrast of modulation optical system 200 was measured with the device "A" VA-LCD used previously in the results shown in FIG. 4, but using a polarization compensator 260 with a C-plate with only ~220 nm of Z-rotation. In this case, as that particular VA-LCD requires ~11–12 nm of XY retardance, which wasn't provided, the resultant contrast, Z only compensated contrast 455, was marginally better at ~650:1 than the uncompensated system contrast 300 over the F# range of F/2 to F/10. However, this result is not as good as the XYZ compensated system contrast 450 which was achieved with device "A", while using the exemplary compensator with a 180 nm C-plate (Z) and a 12 nm A-plate (XY). By comparison, when the aforementioned Z-only compensator is paired with VA-LCD device "B" which naturally has iron cross behavior (that is, needs little or no XY retardance compensation), the contrast at F/2.3 exceeded 2200:1.

As can be seen, the design and construction of polarization compensators is of itself complicated, while the large variations in residual retardance in the LCDs themselves, further complicate the quest for maximized contrast. However, it has been demonstrated that the wire grid polarizers can be rotated in plane by a few degrees, potentially providing a significant enhancement of system contrast, while also potentially simplifying the designs of both modulation optical system 200 and compensator 260. In practice, these rotational adjustments, which were not detailed in the prior cited application (Mi et al.), provide contrast enhancements that are very dependent on the performance of a given LCD, the specific design of the accompanying compensator 260, the F# of the light transiting the modulation optical system 200, and the operating temperature of the LCD. With reference to FIG. 5a, the wire grid polarization beamsplitter 240, wire grid polarization analyzer 270, and wire grid pre-polarizer 230 can each be rotated by a few degrees, with the primary goal of enhancing contrast, while also maximizing light efficiency. Specifically, angular rotation of the wire grid polarization beamsplitter by a small amount (angle ($\beta$)) introduces some XY retardance, effectively allowing tuning of the polarization compensation by the addition of an A-plate. The actual rotation used, which is typically ~3° to 5°, can be 15° or more, or as little as 1° to 2°, depending on the test conditions. The optimal amount rotation ($\beta$) of the wire grid polarization beamsplitter 240 used to increase contrast can depend upon the temperature of the LCD, and the required rotation generally decreases as the LC device is operated at warmer temperatures. Thus it can be important to determine the optimal compensation required for a given LCD at the expected operating temperature. In many systems, the operating temperature of the LCDs may be controlled, either by heating or cooling, to insure operation in the temperature range where the electro-optical response is optimized. In general, the frame sequential modulation contrast of modulation optical system 200, as compared to the uncompensated case, can be enhanced by 2× or more, when ($\beta$) rotation of the wire grid polarization beamsplitter 240 is used.

Although the sub-wavelength wires 250 of wire grid polarization beamsplitter 240 primarily cause this device to function as a polarizer, this structure also introduces a small amount of XY retardance. This can be qualitatively understood by considering the properties of a related optical structure; the form birefringent or "moth's eye" optics. To first order, form birefringent optical structures are similar to the wire grid polarizer 100 of FIG. 3, except that the wires 110 are not metallic, but are dielectric. Also the typical visible wavelength form birefringent optical structure has tall dielectric wires (mesas), with the depth of grooves 115 being large compared to the mesa width (aspect ratio >20:1 for example). By comparison, the typical wire grid polarizer has shallow wires, with the ratio of wire thickness (t) to wire width (w) is a modest ~2:1.

As with the wire grid devices, the dielectric form birefringent structures can have a one dimensional pattern of grooves and wires (mesas), similar to that of FIG. 3. Alternately, two dimensional structures, having a pattern of symmetrical dielectric sub-wavelength grooves and mesas, or a pattern of asymmetrical dielectric sub-wavelength grooves and mesas (different in X and Y), are possible. The symmetrical two dimensional structures can function similar to an anti-reflection (AR) coating, with a broad wavelength, polarization insensitive, and angle insensitive response. The asymmetrical two dimensional patterned structures provide a polarization sensitive anti-reflection behavior. The one-dimensional pattern of dielectric sub-wavelength optical micro-structures, similar to that of FIG. 3, are anisotropic, and provide form birefringence (with different optical retardance values in the X and Y directions), as well as anti-reflection properties. The paper, "Design Considerations of Form Birefringent Micro-structures", by I. Richter et al., (Applied Optics, Vol. 34, No. 14, pp. 2421–2429, May 1995) discusses the detailed design of optical devices. The papers shows how various parameters, such as the pitch (p), width (w), and height or thickness (t) of the mesa/groove structure, can be adjusted to optimize the design. Optics with dielectric micro-structures that are form birefringent can be used as visible spectrum waveplates and retarders, providing 100–400 nm of retardance (up to nearly a wave of retardance), depending on the design. Form birefringence is distinctly different from the more common bulk birefringence, which is observed in crystals, as the latter is caused by anisotropic variations in the electrical properties within the materials.

As the wire grid polarizers and polarization beamsplitters have sub-wavelength structures with XY anisotropy, these structures can introduce small amounts of form birefringence as a byproduct of the design and fabrication of the devices. Furthermore, an alternate improved wire grid polarizer is described in U.S. Pat. No. 6,122,103, which has a sub-wavelength structure where the metal wires are fabricated on top of dielectric ribs of a thickness $t_R$. In that case, the metal wire on dielectric rib structure is utilized to shift transmission resonances to lower wavelengths, thereby extending the wire grid performance more completely across the visible spectrum. The described wire grid polarizer includes an XY anisotropic effective medium structure that likely exhibits XY form birefringence, and thus retardance. The retardance introduces a delay of one polarization relative to the orthogonal polarization, which translates into a phase change $\Delta\phi$ in the polarization of the incoming light. The phase change $\Delta\phi$ can be calculated as $\Delta\phi=2\pi*t*\Delta n/\lambda$, where ($\Delta n$) is the index change ($\Delta n=n_7-n_\perp$) (birefringence) provided by the structure and (t) is the thickness of the structure. Retardance is the phase change $\Delta\phi$ expressed as distance; for example a $\pi/2$ phase change $\Delta\phi$ provides a quarter wave $\lambda/4$ retardance, which at 550 nm equals ~138 nm retardance. However, while anisotropic form birefringence can be anticipated to exist in wire grid polarizers and polarization beam splitters, the application of a controlled rotation to the wire grid polarizers, as they are used in a modulation optical system 200, with the intention of introducing small amounts of XY retardance and thus tuning the contrast, is neither obvious nor anticipated by the prior art. Moreover, the interaction of the wire grid polarizer rotation as a mechanism for simplifying the construction of the modulation optical system 200 and compensator 260 is also not anticipated by the prior art.

Although the wire grid pre-polarizer 230, the wire grid polarization beamsplitter 240, and the wire grid polarization analyzer 270 can all be rotated to some effect to enhance contrast or light efficiency, it is the rotation of the wire grid polarization beam splitter 240 which is most beneficial. The small XY retardance of the wire grid structure is more or less parallel or perpendicular to its wires for the light coming along the system optical axis 275. When the wire grid polarization beam splitter is rotated by some controlled angular amount ($\beta$), from its nominal position ($\beta=0°$), its XY retardance can be oriented to be more perpendicular to the XY retardance of the LCD and consequently better compensate the LCD. Rotation of the wire grid polarization beamsplitter 270 alone (the wire grid pre-polarizer 230 and the wire grid polarization beamsplitter 240 are both stationary (non-rotated)) provides the greatest portion of the observed contrast enhancements (>95% in some cases) discussed below.

Referring again to FIG. 4, three further examples of measured contrast are given for modulation optical system 200, where spatial light modulator 210 was a VA-LCD (specifically device "A"), and rotation of the wire grid polarizers was used to adjust the contrast. In the first example, the contrast was measured where compensator 260 was the exemplary package of a C-plate with 180 nm retardance (Z) and an A-plate with 12 nm retardance (XY), and the wire grid polarization beamsplitter 240 and the wire grid polarization analyzer 270 were both tweaked angularly. The result, combination XYZ compensator and wire rotation contrast 460 shows that the measured contrast of ~1600:1 at F/2.3 is basically equivalent to the XYZ compensated system contrast 450 provided by this compensator alone. However, the wire rotation does give a small contrast enhancement at the higher F-numbers. This measured combination XYZ compensator and wire rotation contrast 460 is of course much higher than the uncompensated system contrast 300. To obtain this result, the wire grid polarization beam splitter 240 was rotated by $\beta\sim0.5-2°$, while the wire grid polarization analyzer 270 was rotated by $\alpha\sim1-3°$ in the same direction. While both the wire grid polarization beamsplitter 240 and the wire grid polarization analyzer 270 were rotated the described amounts ($\beta$ and $\alpha$ respectively), these devices are still oriented with their sub-wavelength wires oriented substantially "vertically" ("into the page") relative to FIG. 3. This data basically suggests that modulation optical system 200 can be constructed with a LCD 210 and a compensator 260, while the wire grid polarizers are tweaked angularly to further enhance system contrast.

As the second further example depicted in FIG. 4, the contrast was measured where compensator 260 comprised only a C-plate with 220 nm retardance (Z), and the wire grid polarization beamsplitter 240 and the wire grid polarization analyzer 270 were both rotated angularly. The result, identified as combination Z compensator and wire rotation contrast 465, shows that the measured contrast of ~1100:1 at F/2.3 for this combination is better than both the measured uncompensated system contrast 300 and the Z only compensated contrast 455, but less than either the XYZ compensated system contrast 450 or the combination XYZ compensator and wire rotation contrast 460. To obtain this result, the wire grid polarization beam splitter 240 was rotated by $\beta\sim3-5°$, while the wire grid polarization analyzer 270 was rotated by $\alpha\sim6-7°$ in the same direction. Rotation of the wire grid polarization beam splitter 240 introduced an estimated ~6–8 nm of XY retardance, which was less than the ~12 nm of XY retardance needed by the LCD ("device "A") to maximize contrast. In this case, the modulation optical system 200, using the wire grid polarizers with selective rotation, a LCD 210 and a compensator 260 provides enhanced contrast at F/2.3 which is more than the uncompensated contrast, but less than the contrast with an optimized compensator. This means that the in plane rotation of the wire grid polarizers can potentially be used to boost contrast while simplifying the design and structure of the associated polarization compensator (the exemplary compensator was Z-only).

As the third further example depicted in FIG. 4, the contrast was measured for a modulation optical system 200, which included the wire grid polarization beam splitter 240, the wire grid polarization analyzer 270, the wire grid pre-polarizer 230, and the LCD 210 (device "A'"), but which was tested without compensator 260, while the wire grid polarization beam splitter and analyzer were both rotated angularly. The result, identified as rotation only contrast 470, shows ~700:1 contrast at F/2.3, which is better than the measured uncompensated system 300 and comparable to the Z only compensated contrast 455. More significantly, at F/2.3, the rotation contrast for this example (LCD 210 as device "A") is below the ~1,000:1 target specification for system contrast, and below the measured XYZ compensated system contrast 450 and the combination XYZ compensator and wire rotation contrast 460. Thus, for an LCD 210 similar to exhibit device "A", in plane rotation of the wire grid devices does not provide sufficient retardance to compensate for the residual retardance in the device, and a further polarization compensator is needed.

More generally, FIG. 4 shows that the contrast for a modulation optical system 200, which operates at ~F/4 or less, and employs a combination of an LCD 210 and a compensator 260, whose XY and Z retardances are well matched, are higher than the contrasts provided by other means. Specifically, for this example (VA-LCD device "A"), both the XYZ compensated system contrast 450 and the combination XYZ compensator and wire rotation contrast 460 are both significantly higher than the wire rotation only contrast 470 at F-numbers of ~4.0 or less. Experimentation has also shown the ~F/4 to ~F/6 region to be a crossover region, where depending on the specific LCD and specific compensator used, the highest contrast may be achieved with a polarization compensator, or by in plane rotation of the wire grid polarizers, or by a combination of the two. Even in the cross over F/4 to F/6 region, the use of a polarization compensator that is well matched to a given LCD, will generally provide the highest contrast. However, in this crossover F/4 to F/6 region, the contrast provided by rotation of the wire grid polarizers may be high enough (>1,000:1) to satisfy the contrast requirements for a demanding application such as digital cinema projection, without using a polarization compensator, for a significant selection of the available LCDs from the production line. Above F/6, the contrast provided by rotation of the wire grid polarizers (470) generally matches or exceeds the contrast obtained when a polarization compensator is used. In that case, modulation optical system 200 can be simplified, as compensator 260 can be omitted and superior contrast can still be obtained.

The contrast plots versus F-number provided in FIG. 4 were all obtained specifically from tests with the VA-LCD identified as device "A". An equivalent range of measurements were completed using the previously described VA-LCDs identified as device "B" and device "C", tested within modulation optical system 200. Although these devices exhibited rather different behavior than device "A", including significantly different innate internal residual XY and Z retardances, the conclusions obtained with device "A" and shown in FIG. 4, generally applied to these devices as well. In particular, VA-LCD devices "A" and "C" have residual XYZ retardances such that both devices provide the baseball pattern type iso-contrast when tested without polarization compensation, although device "C" under performed (less contrast) device "A" for each of the test conditions. However, device "C", like the "device "A" data shown in FIG. 4, provided the highest contrast below F/4 for the test cases of XYZ compensated system contrast 450 and combination XYZ compensator and wire rotation contrast 460 (~1100:1 and higher), with the combination Z compensator and wire rotation contrast 465 and the wire rotation only contrast 470 at intermediate values (800:1$^+$ and 600:1$^+$ respectively), and the Z only compensated contrast 455 and uncompensated system contrast 300 providing the lowest contrast (~500:1). Likewise, the F/4 to F/6 region was also a crossover region for device "C", where the highest contrast was obtained by using a polarization compensator, but compensation by means of wire rotation alone provided high contrasts, which exceeded some compensator combinations where actual polarization compensators were used. Finally, above F/6, the test results with device "C" were similar to those of device "A", such that the contrast provided by rotation of the wire grid polarizers (470) generally matched or exceeded the contrast obtained when a polarization compensator is used.

The results for the VA-LCD device "B", which is the device which possesses the innate iron cross behavior as observed look at the iso-contrast, showed significantly different behavior relative to devices "A" and "C", and yet the general conclusions were similar. In particular, with this device, the highest contrast was obtained using a Z only compensator (the 220 nm Z compensator), rather than with the XYZ compensator (the 180 nm Z and 12 nm XY compensator), although the contrast for both was quite high (above 1500:1 at F/2.3 and >2,000:1 over the remaining F/3 to F/10 range). The contrast provided when using device "B" in a "native" state, without assistance from either a polarization compensator or wire grid polarizer rotation, was lower than the prior cases with the Z only compensator or the XYZ compensator. In particular, F/2.3 at the native state contrast failed the >1000:1 target for digital cinema. However, the native contrast for this same device "B" exceeded >1500:1 over the F/4 to F/10 range. Certainly polarization compensation by means of rotation of the wire grid polarizers may provide diminished advantages for iron cross iso-contrast devices than for baseball pattern iso-contrast devices, when compared to using a simple Z only compensator or operating the device "native" (above ~F/4). However, in the particular case of VA-LCD device "B", the pure iron cross behavior was available only when this device was tested in its off state, without even a bias voltage. As soon as a bias voltage was applied, the iron cross pattern shifted into a baseball pattern, albeit a darker, higher contrast one than observed with either devices "A" or "C". In operation, device "B" possesses a small amount of residual XY retardance (~2~3 nm), which can be compensated for by rotating the wire grid polarizers.

In general, the experiments with the various VA-LCDs indicate that in plane rotation of the wire grid polarizers within a modulation optical system 200 contribute an adjustable amount of XY retardance, which can be used for polarization compensation, thereby boosting contrast. Controlled rotation of the wire grid polarizers generally increases the measured contrast across the entire tested F/2.3 to F/10 region, possibly eliminating the need to use a polarization compensator. This is particularly true for optical systems operating at speeds of F/6 and higher. For demanding applications, requiring modulation contrasts of 1,000:1 and higher, and operating at speeds below F/4, the best results are achieved by using a polarization compensator which provides XY and Z retardances that are well matched to the accompanying LCD. However, controlled rotation of the wire grid polarizers can be used to further tune or maximize contrast in such cases even in this region. The F/4 to F/6 region provides mixed results, where rotation of the wire grid polarizers provides significant contrast enhancement, and may be sufficient by itself, but where the use of a polarization compensator, by itself or in combination with wire grid rotation, generally provides significant further contrast enhancement.

As noted previously, the contrast enhancements provided by rotation of the wire grid polarizers are primarily obtained by the in plane rotation of the wire grid polarization beamsplitter 240 by a small amount ($\beta$) within modulation optical 200 (see FIG. 5*a*). Rotation of the wire grid beamsplitter provides the greatest benefit, as it is by that means that the XY retardance of the anisotropic structure is actually utilized. As the amount of rotation is generally small ($\beta$~3–5°), the efficiency loss through the polarization analyzer is generally small. The polarization analyzer, which is nominally also a wire grid polarizer, can be rotated in plane by an angle ($\alpha$), as shown in FIG. 5a, to further boost contrast and system efficiency. In most of the experiments, the wire grid polarization analyzer 270 was rotated by a relatively small angle ($\alpha\sim 6-7°$) in the process of tuning contrast and efficiency. The wire grid polarization analyzer 270 was rotated in the same direction as was the wire grid polarization beamsplitter 240. Although the two could be rotated by the same amount ($\alpha=\beta$), in general the best results were obtained when the analyzer rotation was larger ($\alpha>\beta$). However, the gains provided by rotation of the wire grid polarization analyzer 270 were small enough that in some case it may be sensible to leave the analyzer stationary (non-rotated). In the above experiments, when the wire grid polarization analyzer was rotated by a larger angle ($\alpha>8°$) both the measured contrast and light efficiency generally started to decrease. In some test cases, the wire grid polarization beam splitter 240 was rotated by much larger angles ($\beta\sim 15°$ or more) while optimizing contrast. In such cases, rotating the (wire grid) polarization analyzer by an angle ($\alpha$) can provide greater benefits.

Similarly, the pre-polarizer can also be rotated to boost contrast. FIG. 5a illustrates how a wire grid pre-polarizer 230 can be rotated in plane by an angle ($\delta$). As an example, the wire grid pre-polarizer 230 was rotated, while the wire grid polarization beamsplitter 240 and the wire grid polarization analyzer 270 were maintained at the nominal optimal angles described previously, $\beta\sim 4°$ and $\alpha\sim 6°$ respectively. When the wire grid pre-polarizer was rotated by $\delta\sim 4-8°$, the contrast increased a small but significant amount (from ~1100 to ~1140), and the efficiency increased negligibly (<1%) when tested at F/2.3 with device "A" while using the Z only compensator (Z only compensated contrast 455 of FIG. 4). However, when the wire grid pre-polarizer 230 was rotated by larger amounts ($\delta>8°$) the contrast continued to slowly increase, but the light efficiency through the modulation optical system 200 decreased dramatically. It should be noted that the rotations of these polarizers are nominally described as being in plane for each respective polarizer (see FIG. 5a), but that any of these polarizers could have a tilt angle relative to the beam (non normal incidence for the pre-polarizer and the analyzer for example), and the devices would still be rotated in plane. For example, a small tilt of the polarization analyzer might be introduced to control back reflections and ghost images.

Certainly, it is well known in the field of optics, that in polarization optical systems using crossed polarizers and an optical light modulator, that one polarizer may be rotated relative to another to optimize contrast or light throughput efficiency. However, in this invention, the polarizers are rotated to utilize an inherent XY retardance provided by the anisotropic sub-wavelength form birefringent structure as a means of polarization compensation, relative to the spatial light modulator (LCD) or the polarizers themselves. By introducing polarization compensation in this manner, the design and manufacture of the actual polarization compensator 260 can be simplified, or in some cases, substituted for, thus both simplifying the entire modulation optical system while improving the modulation contrast.

Obviously, for the beneficial XY retardance to be introduced by rotation of the polarization beam splitter, the beam splitter must have this retardance within it structure. The wire grid polarization beam splitter, with its anisotropic sub-wavelength wire grid structure, can provide small amounts of XY retardance. It may be possible to develop and fabricate a wire grid polarizer or polarization beam splitter in which the XY retardance, or the anisotropic form birefringence, is controlled and optimized as a design parameter. In that case, it would be expected that the design and performance of modulation optical system 200 which utilized such a wire grid device would be further improved or simplified, as the matching of the LCDs, polarization compensators 260, and rotated wire grid polarizers could be further optimized. It is also conceivable that other polarizers that rely on spatially anisotropic form dichroic, form birefringent, or sub-wavelength structures, may exhibit a useful XY retardance with rotation. For example, the dye sheet polarizer, as developed by Polaroid and Optiva (see U.S. Pat. Nos. 2,237,567 and 6,049,428) which use stretched dye/polymers and the "Polarcor" polarizer from Corning Inc. (U.S. Pat. No. 5,430,573) which uses pattern aligned silver grains, may both exhibit some XY retardance. However, in both cases, any XY retardance is likely to be even less than with the wire grid polarizer. Furthermore, these alternate polarizers generally under perform the wire grid polarizers in the visible spectral region, particularly relative to light efficiency. Alternately, it is possible to construct polarizers with anisotropic form birefringent sub-wavelength structures without using metal structures, as in the wire grid polarizers. For example, the article "Design, fabrication, and characterization of form-birefringent multi-layer polarizing beam splitter" by R. Tyan et al., (JOSA A, Vol. 14, no. 7, pgs. 1627–1636, Jul. 1997) describes a polarizing beam splitter constructed with anisotropic multi-layer dielectric sub-wavelength structures. Although the polarizing beam splitter of Tyan et al. generally underperforms the comparable wire grid polarizer, as its' design utilizes anisotropic form birefringence, it too can be expected to introduce some XY retardance with rotation, which could be used for polarization compensation of an adjacent spatial light modulator (LCD).

It is not required that either the pre-polarizer or the polarization analyzer used in modulation optical system 200 be wire grid polarizer devices. It is certainly advantageous that these polarizers have high visible light efficiency, provide relatively high contrast across the visible spectrum (~100:1$^+$) and are fabricated as thin sheets. For example, rotating a MacNeille type polarization beamsplitter may be problematic, relative to both the mechanics and the disposition of the rejected light. Certainly, the wire grid polarizer is a prime candidate, as it has high efficiency for the transmitted polarization, high contrast, large angular acceptance, and is robust under high thermal loads. Nonetheless, other optical polarizers could potentially be used.

Likewise, it may also be possible to construct a simplified version of the modulation optical system 200, in which rotation of the wire grid polarization beamsplitter 240 is used to introduce XY retardance as compensation for the innate XY retardance of the LCD 210, while other polarization components are removed, but the target contrast is still obtained. In particular, the light handling efficiency of modulation optical system 200 would be improved if the pre-polarizer, polarization analyzer, or both of these components, could be removed. As discussed previously, the wire grid polarization beamsplitter 240 provides rather high contrast in transmission, but only modest contrast in reflection. Unless the reflected contrast is improved dramatically (from <50:1 to >1,500:1), the modulation optical system of FIG. 3, which is disposed to reflect the modulated image bearing light 290 into the projection lens 285, still needs a polarization analyzer to provide the target contrast for a digital cinema application. However, as the existing commercially available wire grid polarization beamsplitters provide transmitted contrast in the red and green of ~1,000–1, 200:1, it is not unrealistic to consider a modulation optical system 200 constructed without a pre-polarizer. For example, should visible wavelength wire grid polarization beamsplitters become available with a reduced wire pitch (p~100–120 nm), the contrast across the entire visible spectrum may exceed 2,000:1, making the pre-polarizer extraneous.

Figure 8:
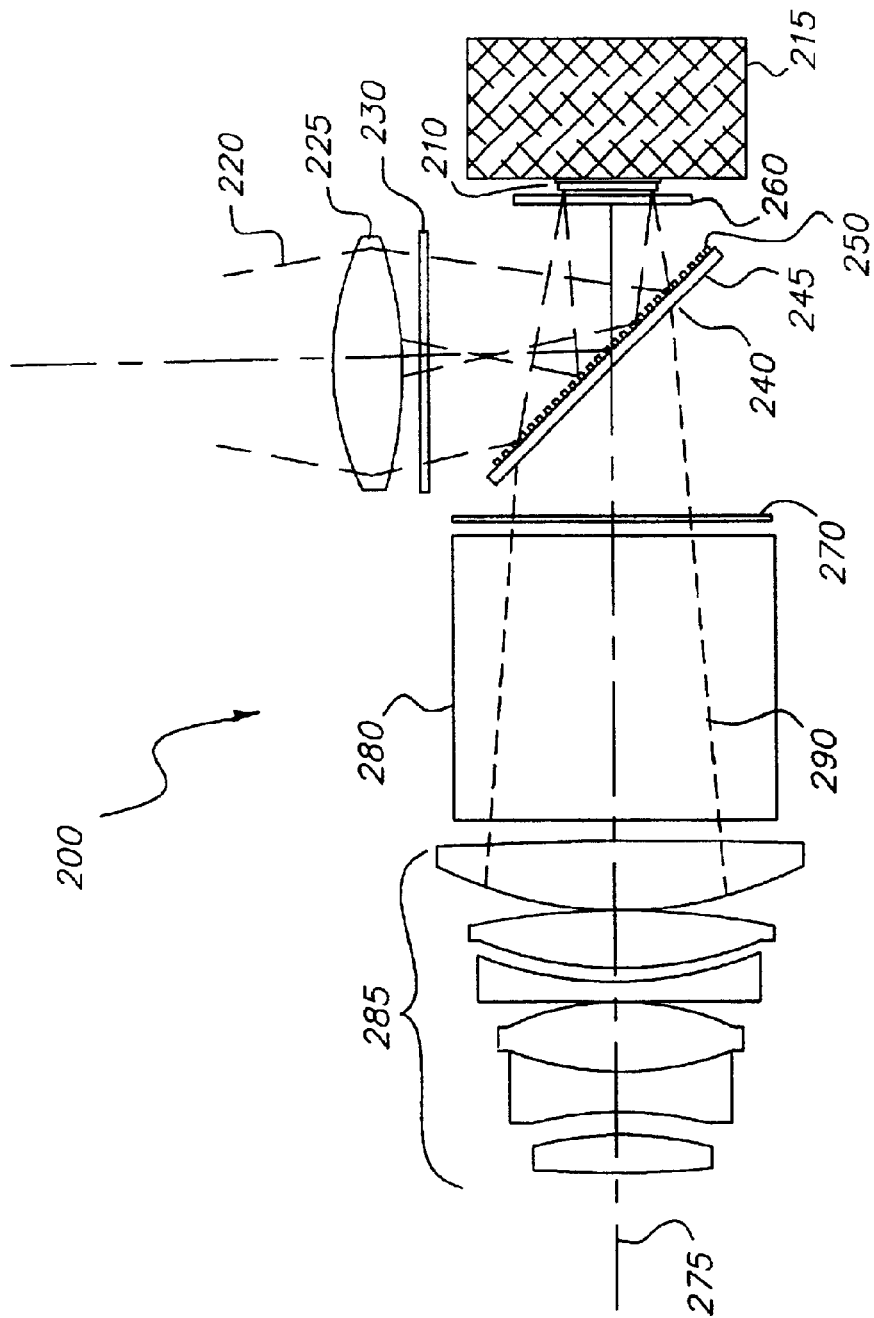
FIG. 8 shows is a cross sectional view showing an alternate modulation optical system which includes a wire grid polarization beamsplitter.

The concepts of this invention, which relate to a modulation optical system 200, wherein the rotation of the wire grid polarizers, and particularly the rotation of the wire grid polarization beamsplitter 240, is used to introduce XY retardance and thus partially compensate for the XY retardances innate to the neighboring LCD 210, have been specifically described relative to the system depicted in FIGS. 1 and 3. In that system, the wire grid polarization beamsplitter 240 is disposed to receive light from the LCD 210 and compensator 260, and then reflect the modulated image bearing light 290 into the projection lens 285. It should be understood that these same principles of utilizing rotation of the wire grid polarizers to provide polarization compensation for the LCD 210 can also be applied to a modulation optical system 200 where the wire grid polarization beamsplitter 240 is disposed to transmit the modulated image bearing light beam 290 into the projection lens 285. While such a system, which is depicted in FIG. 8, would suffer the aberrations (coma and astigmatism) introduced by the transmission of imaging light through a tilted plate, this architecture provides an otherwise simplified construction and alignment. In the case of the modulation optical system 200 of FIG. 8, it may be possible to construct this system without the polarization analyzer 270, as the wire grid polarization beamsplitter 270 provides high contrast in transmission. Obviously removing this component simplifies the system and enhances light efficiency.

It should be understood that the polarization compensation concepts developed within this application for optimizing the polarization performance of modulation optical system 200, by rotating the wire grid polarization beamsplitter 240, and perhaps other wire grid polarizers, either alone or in combination with a polarization compensator, could be used in modulation optical systems which have spatial light modulators other than vertically aligned LCDs. For example, spatial light modulator 210 could also be a 60 degree twisted nematic LCD, a multi-domain vertically aligned (MVA) LCD, a PLZT modulator, or some other polarization rotating modulator.

Furthermore, it should be noted that the optimal compensating retardances for a LCD can vary not only from device to device, but also with operational parameters. For example, it was previously noted that device "C" exhibits iron cross pattern iso-contrast with no applied voltage, but a slight baseball pattern iso-contrast with the Off state bias voltage applied. It has also been observed that the nominal compensating retardances vary with the operating temperature of the LCD. This can mean that it is not only important to control the temperature of the LCD, but also to optimize the compensation, whether originating with a compensator, wire grid polarizer rotation, or the combination thereof, at the target LCD operating temperature.

It should also be understood that the modulation optical system 200 described as part of this invention, which nominally includes the pre-polarizer, the wire grid polarization beamsplitter, a wire grid polarizer for a polarization analyzer, a LCD, and a possible polarization compensator, and in which nominally both the wire grid polarization beamsplitter and the polarization analyzer may be rotated in order to enhance contrast and possibly simplify the design of the polarization compensator, may be used for applications other than electronic projection for digital cinema. In particular, the aforementioned modulation optical system may also be used in a printing system, such as for printing photographic images on either paper or film. In that case, the projection optics 70 would be replaced with printing optics, generally operating at a small magnification (1:1 to 10:1). Likewise, this concept can be used in single channel color sequential system (for projection or printing) described previously.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10. Digital projection apparatus
 15. Light source
 20. Illumination optics
 40. Modulation optical system
 45. Pre-polarizer
 50. Wire grid polarization beamsplitter
 55. Spatial light modulator
 60. Polarization analyzer
 65. Recombination prism
 70. Projection optics
 75. Display surface
100. Wire grid polarizer
110. Conductive elements or wires
115. Grooves
120. Dielectric substrate
130. Beam of light
132. Light Source
140. Reflected light beam
150. Transmitted light beam
200. Modulation optical system
210. Spatial light modulator (LCD)
220. Illumination light beam
225. Condensor
230. Wire grid pre-polarizer
240. Wire grid polarization beamsplitter
245. Dielectric substrate
250. Sub-wavelength wires
260. Compensator
270. Wire grid polarization analyzer
275. Optical axis
280. Recombination prism
285. Projection lens
290. Modulated image-bearing light beam
300. Uncompensated system contrast
320. Iron Cross pattern
325. Baseball pattern
350. Pre-polarized beam
355. Transmitted beam
360. Modulated beam 365. Leakage light
370. Transmitted light
400. Multi-layer compensator
410a. Birefringent layers
410b. Birefringent layers
410c. Birefringent layers
420. Substrate
450. XYZ compensated system contrast
455. Z only compensated contrast
460. Combination XYZ compensator and wire rotation contrast
465. Combination Z compensator and wire rotation contrast
470. Wire rotation only contrast

What is claimed is:

1. A display apparatus comprising:
   (a) a light source for forming a beam of light;
   (b) a pre-polarizer for polarizing said beam of light to provide a polarized beam of light;
   (c) a wire grid polarization beamsplitter for receiving said polarized beam of light, for transmitting said polarized beam of light having a first polarization, and for reflecting said polarized beam of light having a second polarization;
   (d) a reflective spatial light modulator for selectively modulating said polarized beam of light having said first polarization to encode image data thereon in order to form a modulated beam, and for reflecting said modulated beam back to said wire grid polarization beamsplitter;
   (e) a compensator, located between said wire grid polarization beamsplitter and said reflective spatial light modulator, for conditioning the polarization states of oblique and skew rays of said modulated beam;
   (f) wherein said wire grid polarization beamsplitter reflects said compensated modulated beam, and wherein said wire grid polarization beamsplitter is rotated in plane to a nominal fixed position so as to introduce retardance as a further means to compensate said compensated modulated beam;
   (g) a polarization analyzer which removes residual light of an opposite polarization state from said compensated modulated beam; and
   (h) image-forming optics for forming an image from said compensated modulated beam.

2. The apparatus of claim 1 wherein said compensator comprises one or more birefringent layers which comprise a C-plate film, or an A-plate film, or a biaxial film, or a combination thereof.

3. The apparatus of claim 1 wherein said polarization analyzer has in plane retardance and is rotated to optimize said contrast or light efficiency or both.

4. The apparatus of claim 1 wherein said pre-polarizer has in plane retardance and is rotated in plane to a nominal fixed position to optimize said contrast or light efficiency or both.

5. The apparatus of claim 1 wherein said polarization analyzer is a wire grid polarizer comprising a sub-structure of parallel sub-wavelength wires.

6. The apparatus of claim 5 wherein said polarization analyzer has in-plane retardance and is rotated in plane to a nominal fixed position to optimize said contrast or light efficiency or both.

7. The apparatus of claim 1 wherein said reflective spatial light modulator is a reflective liquid crystal device.

8. The apparatus of claim 7 wherein said reflective liquid crystal device has a vertically aligned construction.

9. The apparatus of claim 1 wherein said compensator conditions said polarization states of said oblique and skew rays relative to said wire grid polarization beamsplitter, or said reflective spatial light modulator, or both.

10. The apparatus of claim 1 wherein said pre-polarizer is a wire grid polarization devices comprising a sub-structure of parallel sub-wavelength wires.

11. The apparatus of claim 10 wherein said pre-polarizer is rotated in plane to optimize said contrast or light efficiency or both.

12. The apparatus of claim 1 wherein said beam of light is operating at f-numbers of F/6 or less.

13. The apparatus of claim 1 wherein a sub-structure of parallel sub-wavelength wires that comprise said wire grid polarization beamsplitter are oriented closer to said reflective spatial light modulator than a substrate on which said sub-wavelength wires are formed.

14. The apparatus of claim 1 wherein said wire grid polarization beamsplitter is oriented at a nominal angle of 45 degrees relative to said polarized beam of light.

15. The apparatus of claim 1 wherein said wire grid polarization beamsplitter is rotated in plane by an angle of less than 20 degrees.

16. The apparatus of claim 1 wherein said rotation of said wire grid polarization beam splitter is a function of a temperature of said reflective spatial light modulator.

17. The apparatus of claim 1 wherein said compensator is rotated to optimize said contrast or light efficiency or both.

18. A display apparatus comprising:
    (a) a light source for forming a beam of light;
    (b) a pre-polarizer for polarizing said beam of light to provide a polarized beam of light;
    (c) a wire grid polarization beamsplitter for receiving said polarized beam of light, for transmitting said polarized beam of light having a first polarization, and for reflecting said polarized beam of light having a second polarization;
    (d) a reflective liquid crystal device for selectively modulating said polarized beam of light having a first polarization to encode image data thereon in order to form a modulated beam, and for reflecting said modulated beam back to said wire grid polarization beamsplitter;
    (e) wherein said wire grid polarization beamsplitter reflects said modulated beam, and where said wire grid polarization beamsplitter is rotated in plane to a nominal fixed position so as to introduce retardance and provide polarization compensation for said modulated beam;
    (f) a polarization analyzer which removes residual light of the opposite polarization state from said modulated beam; and
    (g) image-forming optics for forming an image from said modulated beam.

19. The apparatus of claim 18 wherein said polarization analyzer has in plane retardance and is rotated in plane to a nominal fixed position to optimize said contrast or light efficiency or both.

20. The apparatus of claim 18 wherein said polarization analyzer is a wire grid polarizer comprising a sub-structure of parallel sub-wavelength wires.

21. The apparatus of claim 20 wherein said polarization analyzer has in plane retardance and is rotated in plane to a nominal fixed position to optimize said contrast or light efficiency or both.

22. The apparatus of claim 18 wherein said rotation of said wire grid polarization beamsplitter provides polarization compensation for said modulated beam by compensating for residual in plane retardance of said reflective liquid crystal device.

23. The apparatus of claim 18 wherein said reflective liquid crystal device is a vertically aligned liquid crystal device.

24. The apparatus of claim 18 wherein said pre-polarizer is a wire grid polarization devices comprising a sub-structure of parallel sub-wavelength wires.

25. The apparatus of claim 24 wherein said pre-polarizer has in plane retardance and is rotated in plane to a nominal fixed position to optimize said contrast or light efficiency or both.

26. The apparatus of claim 18 wherein said beam of light is operating at f-numbers of F/2.0 or greater.

27. The apparatus of claim 18 wherein the sub-structure of said parallel sub-wavelength wires that comprise said wire grid polarizing beamsplitter are oriented closer to said reflective spatial light modulator than is the substrate on which said sub-wavelength wire are formed.

28. The apparatus of claim 18 wherein said wire grid polarization beamsplitter is oriented at a nominal angle of 45 degrees relative to said polarized beam of light.

29. The apparatus of claim 18 wherein said wire grid polarization beamsplitter is rotated in plane by an angle of less than 20 degrees.

30. The apparatus of claim 18 wherein said rotation of said wire grid polarization beam splitter is a function of the temperature of said reflective spatial light modulator.

31. A modulation optical system for providing high contrast modulation of an incident light beam, comprising:
 (a) a pre-polarizer for pre-polarizing said beam of light to provide a polarized beam of light;
 (b) a wire grid polarization beamsplitter for receiving said polarized beam of light, for transmitting said polarized beam of light having a first polarization, and for reflecting said polarized beam of light having a second polarization;
 (c) a reflective spatial light modulator for selectively modulating said polarized beam of light having a first polarization to encode image data thereon in order to form a modulated beam, and for reflecting said modulated beam back to said wire grid polarization beamsplitter;
 (d) a compensator, located between said wire grid polarization beamsplitter and said reflective spatial light modulator, for conditioning the polarization states of oblique and skew rays of said modulated beam;
 (e) wherein said wire grid polarization beamsplitter reflects said compensated modulated beam, and wherein said wire grid polarization beamsplitter is rotated in plane to a nominal fixed position as a further means to compensate said compensated modulated beam; and
 (f) a polarization analyzer which removes residual light of the opposite polarization state from said compensated modulated beam.

32. The system of claim 31 wherein said compensator comprises one or more birefringent layers which comprise a C-plate film, or an A-plate film, or a biaxial film, or a combination thereof.

33. The system of claim 31 wherein said polarization analyzer has in plane retardance and is rotated in plane to a nominal fixed position to optimize said contrast or light efficiency or both.

34. The system of claim 31 wherein said polarization analyzer is a wire grid polarizer comprising a sub-structure of parallel sub-wavelength wires.

35. The system of claim 34 wherein said polarization analyzer has in plane retardance and is rotated in plane to a nominal fixed position to optimize said contrast or light efficiency or both.

36. The system of claim 31 wherein said reflective spatial light modulator is a reflective liquid crystal device.

37. The system of claim 36 wherein said reflective liquid crystal device is a vertically aligned liquid crystal device.

38. The system of claim 31 wherein said compensator conditions the polarization states of the oblique and skew rays relative to said wire grid polarization beamsplitter, or said reflective spatial light modulator, or both.

39. The system of claim 31 wherein said pre-polarizer is a wire grid polarization devices comprising a sub-structure of parallel sub-wavelength wires.

40. The system of claim 39 wherein said pre-polarizer is rotated in plane to a nominal fixed position to optimize said contrast or light efficiency or both.

41. The system of claim 31 wherein said beam of light is operating at f-numbers of F/6 or less.

42. The system of claim 31 wherein a sub-structure of parallel sub-wavelength wires that comprise said wire grid polarizing beamsplitter are oriented closer to said reflective spatial light modulator than is a substrate on which said sub-wavelength wire are formed.

43. The system of claim 31 wherein said wire grid polarization beamsplitter is oriented at a nominal angle of 45 degrees relative to said polarized beam of light.

44. The system of claim 31 wherein said wire grid polarization beamsplitter is rotated in plane by an angle of less than 20 degrees.

45. The system of claim 31 wherein the rotation of said wire grid polarization beamsplitter is a function of a temperature of said reflective spatial light modulator.

46. The system of claim 31 which is used within a projection display apparatus or within a printing system.

47. A modulation optical system for providing high contrast modulation of an incident light beam, comprising:
 (a) a pre-polarizer for pre-polarizing said beam of light to provide a polarized beam of light;
 (b) a wire grid polarization beamsplitter for receiving said polarized beam of light, for transmitting said polarized beam of light having a first polarization, and for reflecting said polarized beam of light having a second polarization;
 (c) a reflective spatial light modulator for selectively modulating said polarized beam of light having a first polarization to encode image data thereon in order to form a modulated beam, and for reflecting said modulated beam back to said wire grid polarization beamsplitter,
 (d) wherein said wire grid polarization beamsplitter reflects said modulated beam, and where said wire grid polarization beamsplitter is rotated in plane to a nominal fixed position so as to introduce retardance and provide polarization compensation for said modulated beam; and
 (e) a polarization analyzer which removes residual light of the opposite polarization state from said modulated beam.

48. The system of claim 47 wherein said beam of light is operating at f-numbers of F/2.0 or greater.

49. The system of claim 47 wherein said polarization analyzer has in plane retardance and is rotated in plane to a nominal fixed position to optimize said contrast or light efficiency or both.

50. The system of claim 47 wherein said polarization analyzer is a wire grid polarizer comprising a sub-structure of parallel sub-wavelength wires.

51. The system of claim 50 wherein said polarization analyzer has in plane retardance and is rotated in plane to a nominal fixed position to optimize said contrast or light efficiency or both.

52. The system of claim 47 wherein said spatial light modulator is a reflective liquid crystal device.

53. The system of claim 52 wherein said reflective liquid crystal device is a vertically aligned liquid crystal device.

54. The system of claim 47 wherein said pre-polarizer is a wire grid polarization devices comprising a sub-structure of parallel sub-wavelength wires.

55. The system of claim 54 wherein said pre-polarizer is rotated in plane to a nominal fixed position to optimize said contrast or light efficiency or both.

56. The system of claim 47 wherein a sub-structure of parallel sub-wavelength wires that comprise said wire grid polarization beamsplitter are oriented closer to said reflective liquid crystal device than a substrate on which said sub-wavelength wire are formed.

57. The system of claim 47 wherein said wire grid polarization beamsplitter is oriented at a nominal angle of 45 degrees relative to said polarized beam of light.

58. The system of claim 47 wherein said wire grid polarization beamsplitter is rotated in plane by an angle of less than 20 degrees.

59. The system of claim 47 which is used within a projection display apparatus or within a printing system.

60. A modulation optical system for providing high contrast modulation of an incident light beam, comprising:
(a) a pre-polarizer for pre-polarizing said beam of light to provide a polarized beam of light;
(b) a wire grid polarization beamsplitter for receiving said polarized beam of light, for reflecting said polarized beam of light having a first polarization, and for transmitting said polarized beam of light having a second polarization;
(c) a reflective spatial light modulator for selectively modulating said polarized beam of light having a first polarization to encode image data thereon in order to form a modulated beam, and for reflecting said modulated beam back to said wire grid polarization beamsplitter;
(d) a compensator, located between said wire grid polarization beamsplitter and said reflective spatial light modulator, for conditioning the polarization states of oblique and skew rays of said modulated beam;
(e) wherein said wire grid polarization beamsplitter transmits said compensated modulated beam, and where said wire grid polarization beamsplitter is rotated in plane to a nominal fixed position as a further means to compensate said compensated modulated beam; and
(f) a polarization analyzer which removes residual light of the opposite polarization state from said compensated modulated beam.

61. A modulation optical system for providing high contrast modulation of an incident light beam, comprising:
(a) a pre-polarizer for pre-polarizing said beam of light to provide a polarized beam of light;
(b) a wire grid polarization beamsplitter for receiving said polarized beam of light, for reflecting said polarized beam of light having a first polarization, and for transmitting said polarized beam of light having a second polarization;
(c) a reflective spatial light modulator for selectively modulating said polarized beam of light having a first polarization to encode image data thereon in order to form a modulated beam, and for reflecting said modulated beam back to said wire grid polarization beamsplitter;
(d) a compensator, located between said wire grid polarization beamsplitter and said reflective spatial light modulator, for conditioning the polarization states of oblique and skew rays of said modulated beam; and
(e) wherein said wire grid polarization beamsplitter transmits said compensated modulated beam, and where said wire grid polarization beamsplitter is rotated in plane to a nominal fixed position as a further means to compensate said compensated modulated beam.

62. A modulation optical system for providing high contrast modulation of an incident light beam, comprising:
(a) a pre-polarizer for pre-polarizing said beam of light to provide a polarized beam of light;
(b) a wire grid polarization beamsplitter for receiving said polarized beam of light, for reflecting said polarized beam of light having a first polarization, and for transmitting said polarized beam of light having a second polarization;
(c) a reflective spatial light modulator for selectively modulating said polarized beam of light having a first polarization to encode image data thereon in order to form a modulated beam, and for reflecting said modulated beam back to said wire grid polarization beamsplitter;
(d) wherein said wire grid polarization beamsplitter transmits said modulated beam, and where said wire grid polarization beamsplitter is rotated in plane to a nominal fixed position so as to introduce retardance and provide polarization compensation for said modulated beam; and
(e) a polarization analyzer which removes residual light of the opposite polarization state from said modulated beam.

63. A modulation optical system for providing high contrast modulation of an incident light beam, comprising:
(a) a wire grid polarization beamsplitter for receiving said incident beam of light, for transmitting a polarized beam of light having a first polarization, and for reflecting a polarized beam of light having a second polarization;
(b) a reflective spatial light modulator for selectively modulating said polarized beam of light having a first polarization to encode image data thereon in order to form a modulated beam, and for reflecting said modulated beam back to said wire grid polarization beamsplitter;
(c) a compensator, located between said wire grid polarization beamsplitter and said reflective spatial light modulator, for conditioning the polarization states of oblique and skew rays of said modulated beam;
(d) wherein said wire grid polarization beamsplitter reflects said compensated modulated beam, and where said wire grid polarization beamsplitter is rotated in plane to a nominal fixed position as a further means to compensate said compensated modulated beam; and
(e) a polarization analyzer which removes residual light of the opposite polarization state from said compensated modulated beam.

64. A method for projecting an image generated from image data, the method comprising:

(a) providing a polarized light beam;

(b) directing said polarized light beam to a wire grid polarization beamsplitter, said beamsplitter transmitting incident light having a first polarization as a transmitted beam, and reflecting incident light having a second polarization as a reflected beam towards a polarization analyzer;

(c) rotating said wire grid polarization beamsplitter so as to introduce retardance as a means to provide polarization compensation;

(d) modulating said transmitted beam from said wire grid polarization beamsplitter to encode image data at a reflective liquid crystal device and to provide a modulated beam comprising light of said second polarization;

(e) disposing a compensator in the path of said modulated beam, between said wire grid polarization beamsplitter and said reflective liquid crystal device, for conditioning the local polarization states of oblique and skew rays the light so as to help with removing leakage light from said modulated beam; and (f) projecting said modulated beam to form said image.

65. A method for projecting an image generated from image data, the method comprising:

(a) providing a polarized light beam;

(b) directing said polarized light beam to a wire grid polarization beamsplitter, said beamsplitter transmitting incident light having a first polarization as a transmitted beam, and reflecting incident light having a second polarization as a reflected beam towards a polarization analyzer;

(c) rotating said wire grid polarization beamsplitter so as to introduce retardance as a means to provide polarization compensation;

(d) modulating said transmitted beam from said wire grid polarization beamsplitter to encode image data at a reflective liquid crystal device and to provide a modulated beam comprising light of said second polarization; and (e) projecting said modulated beam to form said image.

66. A method for optimizing a projected image comprising:

(a) providing a polarized light beam;

(b) splitting said polarized light beam into a first polarization and second polarization;

(c) modulating said first polarization state with image data;

(d) compensating said modulated beam;

(e) projecting said modulated beam to form an image; and (f) rotating a polarization beamsplitter which possesses an anisotropic form birefringent sub-wavelength structure, such that rotation introduces retardance and provides a means of polarization compensation for said modulated beam.

67. A method for optimizing a projected image comprising:

(a) providing a polarized light beam;

(b) splitting said polarized light beam into a first polarization and second polarization;

(c) modulating said first polarization state with image data;

(d) projecting said modulated beam to form an image; and (e) rotating a polarization beamsplitter which possesses an anisotropic form birefringent sub-wavelength structure, such that rotation introduces retardance and provides a means of polarization compensation for said modulated beam.

68. A modulation optical system for providing modulation of an incident light beam comprising:

(a) a wire grid polarization beamsplitter for receiving incident light beam, for transmitting said a polarized beam of light having a first polarization, and for reflecting a polarized beam of light having a second polarization orthogonal to said first polarization, wherein subwavelength wires on said wire grid polarization beamsplitter face a reflective spatial light modulator;

(b) wherein said reflective spatial light modulator receives said polarized beam of light, having either a first polarization or a second polarization, and selectively modulates said polarized beam of light to encode data thereon, providing both modulated light and unmodulated light which differ in polarization;

(c) wherein said reflective spatial light modulator reflects back both said modulated light and said unmodulated light to said wire grid polarization beamsplitter;

(d) wherein said wire grid polarization beamsplitter separates said modulated light from said unmodulated light;

(e) wherein said modulation optical system is further equipped with one or more wire grid polarizers, which are utilized as a polarization analyzer or a pre-polarizer or both; and (f) wherein said wire grid polarization beamsplitter is used individually or in combination with said other wire grid polarizers to provide polarization compensation by conditioning the polarization states of the oblique and skew light rays.

69. A modulation optical system for providing modulation of an incident light beam comprising:

(a) a wire grid polarization beamsplitter for receiving said incident light beam, for transmitting a polarized beam of light having a first polarization, and for reflecting a polarized beam of light having a second polarization orthogonal to said first polarization, wherein subwavelength wires on said wire grid polarization beamsplitter face a reflective spatial light modulator;

(b) wherein said reflective spatial light modulator receives said polarized beam of light having either a first polarization or a second polarization, and selectively modulates said polarized beam of light to encode data thereon, providing both modulated light and unmodulated light which differ in polarization;

(c) wherein said reflective spatial light modulator reflects back both said modulated light and said unmodulated light to said wire grid polarization beamsplitter;

(d) wherein said wire grid polarization beamsplitter separates said modulated light from said unmodulated light;

(e) wherein said modulation optical system is further equipped with one or more wire grid polarizers, which are utilized as a polarization analyzer or a pre-polarizer or both;

(f) wherein said wire grid polarization beamsplitter is used individually or in combination with said other wire grid polarizers to provide polarization compensation by conditioning the polarization states of the oblique and skew light rays; and wherein said wire grid polarization beamsplitter and said other wire grid polarizers are rotated respectively in plane to a nominal fixed position as a means to polarization compensate said oblique and skew light rays.

70. A modulation optical system as in claim 69 further equipped with a compensator, wherein said compensator conditions the polarization states of said oblique and skew light rays, relative to said wire grid polarization beamsplitter, or said reflective spatial light modulator, or both.

71. A modulation optical system as in claim 69 wherein said reflective spatial light modulator receives said polarized beam of light having a first polarization state transmitted through said wire grid polarization beamsplitter.

72. A modulation optical system as in claim 69 wherein said reflective spatial light modulator receives said polarized beam of light having a second polarization state reflected from said wire grid polarization beamsplitter.

73. A modulation optical system for providing modulation of an incident light beam comprising:
 (a) a wire grid polarization beamsplitter for receiving said incident light beam, for transmitting a polarized beam of light having a first polarization, and for reflecting a polarized beam of light having a second polarization orthogonal to said first polarization, wherein subwavelength wires on said wire grid polarization beamsplitter face a reflective spatial light modulator;
 (b) wherein said reflective spatial light modulator receives said polarized beam of light, having either a first polarization or a second polarization, and selectively modulates said polarized beam of light to encode data thereon, providing both modulated light and unmodulated light which differ in polarization;
 (c) wherein said reflective spatial light modulator reflects back both said modulated light and said unmodulated light to said wire grid polarization beamsplitter;
 (d) wherein said wire grid polarization beamsplitter separates said modulated light from said unmodulated light; and
 (e) wherein said wire grid polarization beamsplitter is rotated in plane to a nominal fixed position as a polarization compensation means to condition the polarization states of said oblique and skew light rays.

74. A modulation optical system as in claim 73 further equipped with a compensator, wherein said compensator conditions the polarization states of said oblique and skew light rays, relative to said wire grid polarization beamsplitter, or said reflective spatial light modulator, or both.

75. A modulation optical system as in claim 73 wherein said reflective spatial light modulator receives said polarized beam of light having a first polarization state transmitted through said wire grid polarization beamsplitter.

76. A modulation optical system as in claim 73 wherein said reflective spatial light modulator receives said polarized beam of light having a second polarization state reflected from said wire grid polarization beamsplitter.

77. A modulation optical system for providing modulation of an incident light beam comprising:
 (a) a polarization beamsplitter, having a form birefringent optical structure for receiving said incident light beam, for transmitting a polarized beam of light having a first polarization, and for reflecting a polarized beam of light having a second polarization orthogonal to said first polarization;
 (b) wherein a reflective spatial light modulator receives said polarized beam of light, having either a first polarization or a second polarization, and selectively modulates said polarized beam of light to encode data thereon, providing both modulated light and unmodulated light which differ in polarization;
 (c) wherein said reflective spatial light modulator reflects back both said modulated light and said unmodulated light to said polarization beamsplitter;
 (d) wherein said polarization beamsplitter separates said modulated light from said unmodulated light;
 (e) wherein said modulation optical system is further equipped with one or more polarizers, which have a form birefringent optical structure, and which are utilized as a polarization analyzer or a pre-polarizer or both;
 (f) wherein said polarization beamsplitter is used individually or in combination with said other form birefringent polarizers to provide polarization compensation by conditioning the polarization states of the oblique and skew light rays; and
 wherein said polarization beamsplitter and said other form birefringent polarizers are rotated respectively in plane to a nominal fixed position as a means to polarization compensate said oblique and skew light rays.

78. A modulation optical system as in claim 77 further equipped with a compensator, wherein said compensator conditions the polarization states of said oblique and skew light rays, relative to said polarization beamsplitter, or said reflective spatial light modulator, or both.

79. A modulation optical system as in claim 77 wherein said reflective spatial light modulator receives said polarized beam of light having a first polarization state transmitted through said polarization beamsplitter.

80. A modulation optical system for providing modulation of an incident light beam comprising:
 (a) a wire grid polarization beamsplitter for receiving said incident light beam, for transmitting a polarized beam of light having a first polarization, and for reflecting a polarized beam of light having a second polarization orthogonal to said first polarization, wherein subwavelength wires on said wire grid polarization beamsplitter face a reflective spatial light modulator;
 (b) wherein said reflective spatial light modulator receives said polarized beam of light, having either a first polarization or a second polarization, and selectively modulates said polarized beam of light to encode data thereon, providing both modulated light and unmodulated light which differ in polarization;
 (c) wherein said reflective spatial light modulator reflects back both said modulated light and said unmodulated light to said wire grid polarization beamsplitter;
 (d) a compensator, located between said wire grid polarization beamsplitter and said reflective spatial light modulator, for conditioning the polarization states of oblique and skew rays of said modulated light;
 (e) wherein said modulation optical system is further equipped with one or more wire grid polarizers, which are utilized as a polarization analyzer or a pre-polarizer or both;
 (f) wherein said wire grid polarization beamsplitter separates said modulated light from said unmodulated light; and
 (g) wherein said wire grid polarization beamsplitter is rotated in plane to a nominal fixed position in order to optimize the polarization contrast of the modulated light.

81. A modulation optical system for providing modulation of an incident light beam comprising:

(a) a pre-polarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;

(c) wherein said reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein said wire grid polarization beamsplitter separates said modulated light from said unmodulated light; and (f) wherein said wire grid polarization beamsplitter is rotated in plane to a nominal fixed position in order to optimize the polarization contrast of the modulated light.

* * * * *